US012214568B2

(12) United States Patent
Agoston et al.

(10) Patent No.: US 12,214,568 B2
(45) **Date of Patent: *Feb. 4, 2025**

(54) SELF CONTAINED COMPACTOR SYSTEM

(71) Applicant: Marathon Equipment Company, South Vernon, AL (US)

(72) Inventors: Bradley Michael Agoston, Fayette, AL (US); Daniel Robert Overstreet, Caledonia, MS (US)

(73) Assignee: Marathon Equipment Company, South Vernon (AL)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,105

(22) Filed: Aug. 11, 2022

(65) Prior Publication Data

US 2023/0030231 A1 Feb. 2, 2023

Related U.S. Application Data

(63) Continuation of application No. 17/009,564, filed on Sep. 1, 2020, now Pat. No. 11,413,836.

(60) Provisional application No. 62/948,057, filed on Dec. 13, 2019.

(51) Int. Cl.

| | |
|---|---|
| ***B30B 1/34*** | (2006.01) |
| ***B30B 15/00*** | (2006.01) |
| ***B30B 15/04*** | (2006.01) |
| ***B30B 15/28*** | (2006.01) |

(52) U.S. Cl.
CPC ............ *B30B 1/34* (2013.01); *B30B 15/0052* (2013.01); *B30B 15/04* (2013.01); *B30B 15/28* (2013.01)

(58) Field of Classification Search
CPC ....... B30B 9/30; B30B 9/3042; B30B 9/3046; B65F 3/14; B65F 3/143; B65F 3/38
USPC .......................................................... 72/432
See application file for complete search history.

(56) References Cited

U.S. PATENT DOCUMENTS

| | | | | | |
|---|---|---|---|---|---|
| 3,734,006 | A * | 5/1973 | Hennells | B30B 1/32 100/53 |
| 4,016,908 | A * | 4/1977 | Heckenkamp | B62D 49/00 222/562 |
| 4,184,424 | A * | 1/1980 | Yeager | B30B 1/32 100/99 |
| 5,632,199 | A * | 5/1997 | Smith | B30B 9/30 100/100 |

(Continued)

FOREIGN PATENT DOCUMENTS

| | | | | |
|---|---|---|---|---|
| EP | 0562487 A1 * | 9/1993 | B30B 9/3032 |
| JP | 08174287 A * | 7/1996 | B30B 9/3096 |
| KR | 20030072080 | 9/2003 | |

OTHER PUBLICATIONS

PCT International Search Report and Written Opinion in International Application No. PCT/US2020/048953, dated Nov. 30, 2020, 11 pages.

*Primary Examiner* — Debra M Sullivan
*Assistant Examiner* — Matthew Stephens
(74) *Attorney, Agent, or Firm* — Fish & Richardson P.C.

(57) ABSTRACT

Embodiments of the present disclosure are directed to new and improved self-contained compactor systems incorporating a straight-push cylinder design, in which the compactor system is actuated in a horizontal direction. The improved design accommodates increased storage volume, long wear parts, simplified reservoir cleaning, and easier external access to the components, cylinders, and hoses of the self-contained compactor system.

25 Claims, 19 Drawing Sheets

(56) References Cited

U.S. PATENT DOCUMENTS

| | | | | |
|---|---|---|---|---|
| 6,418,841 | B1 * | 7/2002 | Little | B30B 9/3007 100/48 |
| 7,886,660 | B1 * | 2/2011 | Sherwood | B30B 9/3082 100/219 |
| 8,578,846 | B2 * | 11/2013 | Sherwood | B30B 9/3021 100/35 |
| 11,413,836 | B2 * | 8/2022 | Agoston | B30B 9/3046 100/214 |
| 2011/0000382 | A1 | 1/2011 | Sherwood et al. | |
| 2012/0291639 | A1 * | 11/2012 | Blankenship | B30B 9/3057 100/214 |
| 2013/0118365 | A1 | 5/2013 | Heppner et al. | |

* cited by examiner

SELF CONTAINED COMPACTOR SYSTEM

CROSS-REFERENCE TO RELATED APPLICATIONS

This application is a continuation of U.S. patent application Ser. No. 17/009,564, filed Sep. 1, 2020, which claims the benefit of U.S. Provisional Application No. 62/948,057, filed Dec. 13, 2019, which are hereby incorporated by reference in their entirety.

TECHNICAL FIELD

The presently disclosed technology relates to new and improved self-contained compactor systems and more particularly self-contained compactor systems incorporating a straight push cylinder design.

BACKGROUND

Commercial trash compactors offer businesses tremendous benefits in the form of reducing trash volume and costs associated with hauling, reducing odors and fire damage, and protecting against pests. Self-contained trash compactors are compactors in which the storage or container body and compaction system are combined into one structure that may be hauled to the landfill as a single unit. They are effective in locations where a compactor must reside in place for extended periods of time as it collects waste materials. Self-contained compactors should accommodate waste with high levels of liquid, such as organic wet waste, in a manner that will prevent contamination of public areas during residency and also minimize the risk of leakage during transportation to the landfill for emptying. Compacting wet waste naturally warrants more frequent cleaning of the compactor over time. Self-contained compactors currently available may not be cleaned as frequently as required due to the design of their cleanout systems and the foul environment caused by this type of waste, therefore methods for facilitating easier cleaning are necessary. In many cases, such avoidance of cleaning out these types of compactors has also resulted in damage to the equipment, requiring repair or replacement. Further, because commercial trash compactors frequently accommodate heavy loads, over time the parts often become worn and require replacement. Current self-contained compactor systems typically require a person to enter into the packer's interior or charge chamber itself to perform maintenance on parts such as hydraulic cylinders, and therefore repair or replacement usually involves work in a confined space where the worker is in direct contact with any waste material remaining inside the compactor, which can be unsanitary and potentially hazardous. Therefore, a self-contained compactor system which allows exterior access to repair parts, provides superior design of parts that encounter heavy wear, and enables improved cleaning methods is needed.

Self-contained compactor systems are more beneficial to a customer when they do not have to be frequently transported away for emptying. Current designs attempt to maximize storage volume, but are restricted in that they must not exceed a footprint which can be effectively transported by commonly available methods, such as a roll-off hoist transport truck. Early designs of self-contained compactor systems incorporated a straight-push cylinder configuration. This design was effective and durable, but required a long tail section, approximately 5 feet, before the charge chamber to accommodate cylinder length. This tail section cannot store refuse, and as such effectively decreases the total storage volume available in any given footprint. In an effort to maximize storage volume per footprint, current self-contained compactor systems now incorporate a more compact cross-cylinder design; however, this configuration may cause decreased life of cylinders, pins, and other parts due to non-linear secondary forces being applied to the components over time. A self-contained compactor system design that can maximize available storage volume within the required footprint for transportation without impacting component life is needed.

Embodiments of the present disclosure are directed to these and other considerations.

SUMMARY

Embodiments of the present disclosure are directed to new and improved trash compactor systems or self-contained compactor systems incorporating a straight-push cylinder design, in which the compactor system is actuated in a horizontal direction. The improved design accommodates simplified reservoir cleaning and easier access to the internal components, cylinders, and hoses of the self-contained compactor system.

In some embodiments, the self-contained compactor system can comprise a packer including a back wall and side walls defining a space for receiving refuse to be compacted and first and second pockets disposed across a top portion of each of the side walls of the packer. The self-contained compactor system can further comprise a ram comprising a ram body and first and second arms coupled to the ram body, the first and second arms each having a top surface disposed approximately planar to a top surface of the ram body and each of the first and second arms projecting outwardly from the ram body. The first and second arms can be configured to be inserted within the first and second pockets of the packer and move horizontally within the first and second pockets.

BRIEF DESCRIPTION OF THE DRAWINGS

FIG. 1F in particular is an inverted isometric view.

DETAILED DESCRIPTION

Figure 1A:
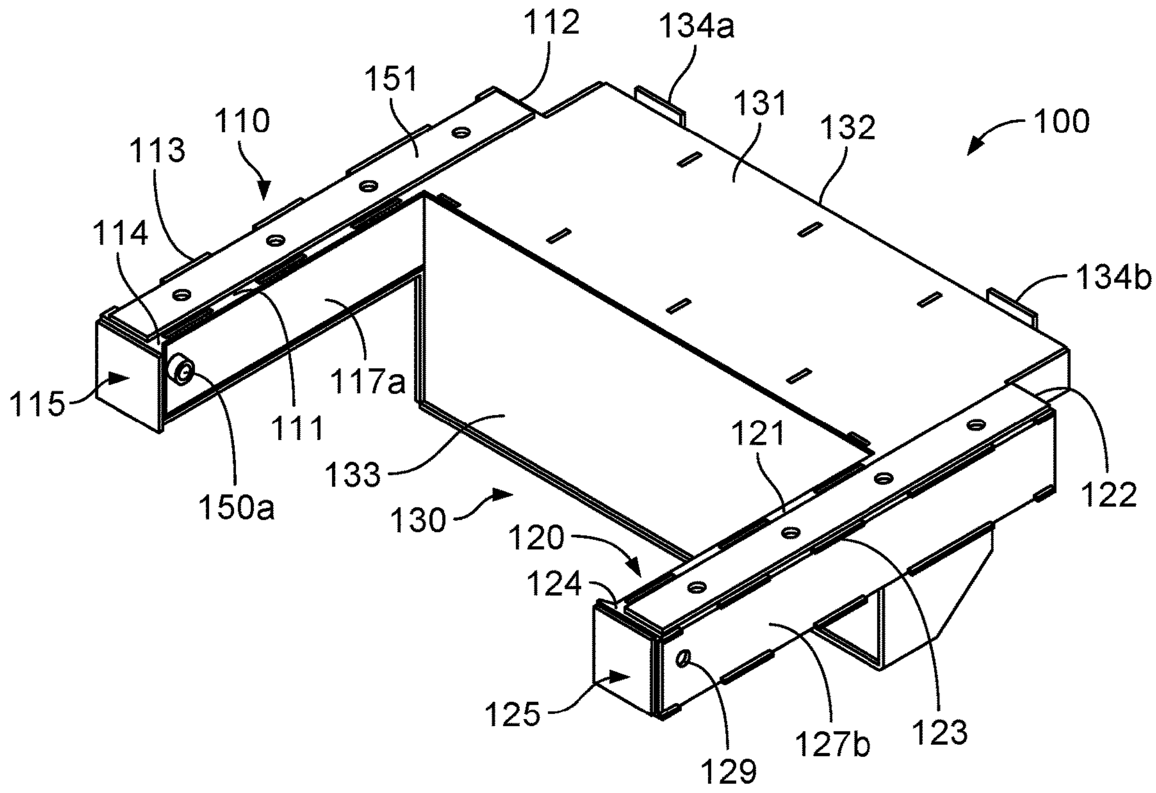
FIGS. 1A-1F illustrate various views of a ram for a self-contained compactor system, according to some embodiments of the present disclosure.
Figure 1B:
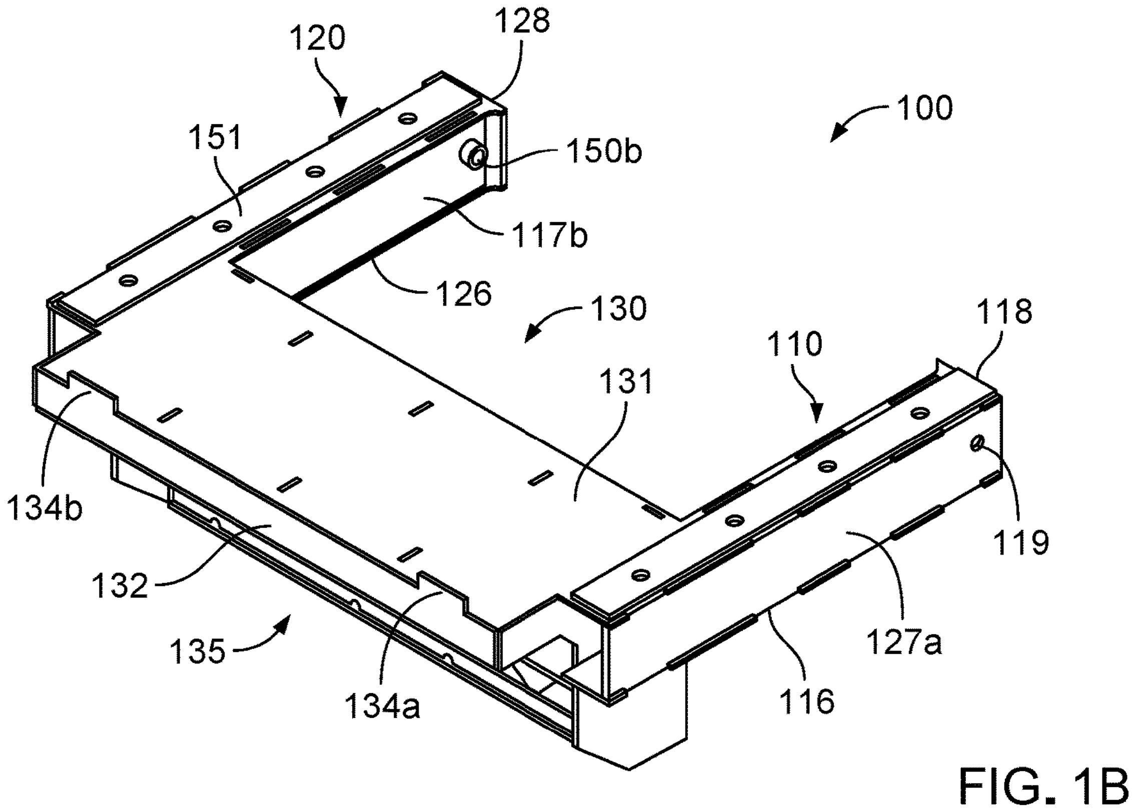
Figure 1C:
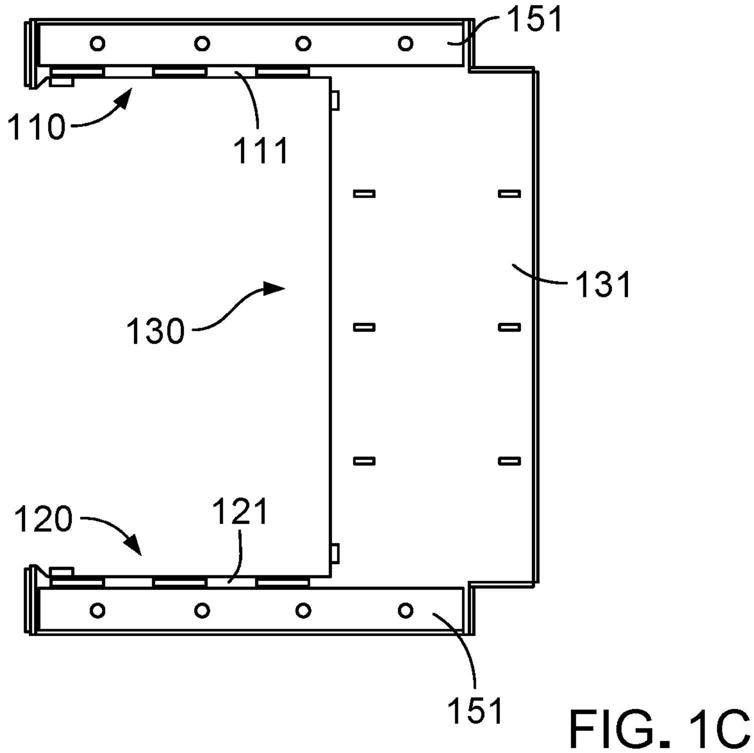
Figure 1D:
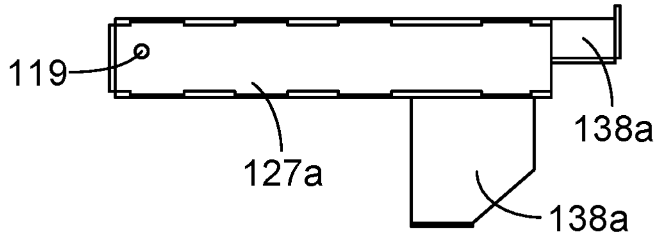
Figure 1E:
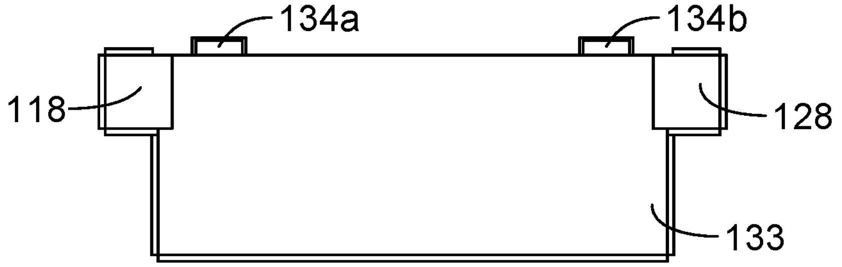
Figure 1F:
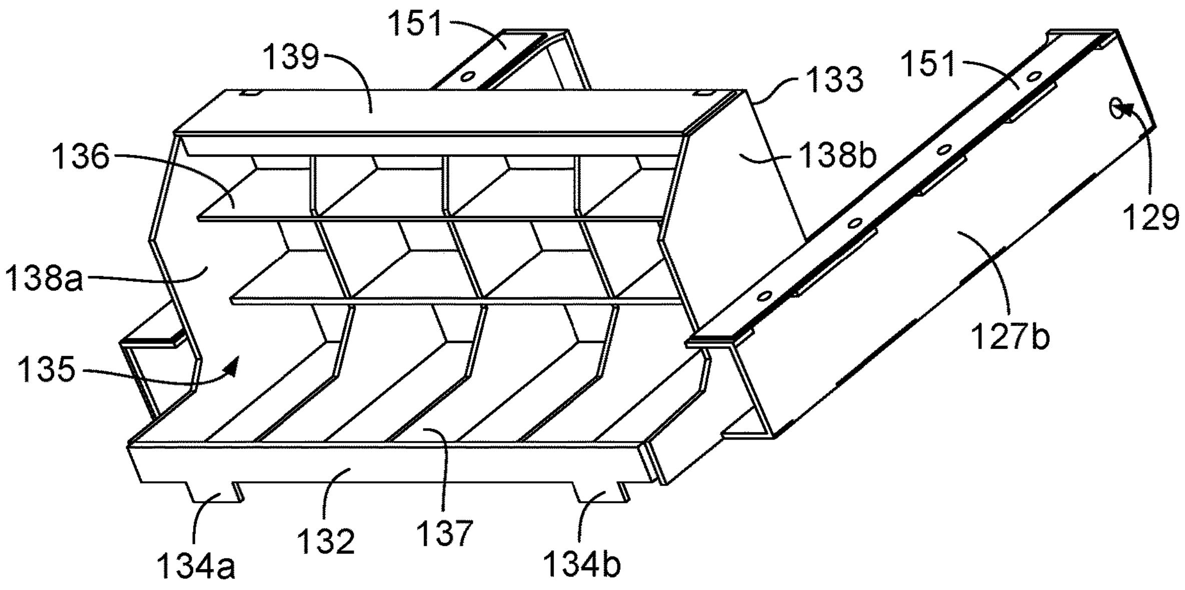

Trash compactors generally include a ram, a packer, a container body, and hydraulics for actuating the ram to compact debris contained within the packer to the container body. The hydraulics work to move the ram away from the packer to force debris into a compact state inside the container body. Embodiments of the presently disclosed self-contained compactor system incorporate a unique housing for the hydraulic cylinders to actuate the ram in a way that facilitates a straight-push design, which maintains the same compactor footprint of the prior design while increasing storage volume, accommodating simplified reservoir cleaning, and providing easier access to non-structural components such as cylinders, and hoses. Access to these components is important because maintaining the trash compactor during its life will undoubtedly require replacement or repair of these parts and cleaning out of the compactor. The various features and functions of the presently disclosed self-contained compactor systems are described in detail below with respect to figures depicting an exemplary embodiment.

FIGS. 1A-1F illustrate various views of a ram 100 of a self-contained compactor system 300 (depicted in FIGS. 3A-3E), according to some embodiments. The ram 100 of FIGS. 1A-1F generally comprises a first arm 110, a second arm 120, and a ram body 130. The first arm 110 and the second arm 120 comprise extensions of the ram body 130 via a top surface 111, 121 of each of the first arm 110 and the second arm 120 which top surfaces 111, 121 are integral to a top surface 131 of the ram body 130, as illustrated for instance in FIG. 1C. As such, the top surface 111, 121 of each of the first arm 110 and the second arm 120 is substantially planar to or co-planar with a top surface 131 of the ram body 130. Additionally, each of the first arm 110 and the second arm 120 can be defined by an insertion end 112, 122 and an extension end 115, 125. Each of the first arm 110 and the second arm 120 can be set parallel to each other and perpendicular to and beyond and in front of a front face 133 of the ram 100. Each of the first and second arms 110, 120 have an axial length between the extension end 115, 125 and the insertion end 112, 122 of each respective arm 110, 120 with the insertion end 112,122 offset rearward of the compacting face 133, opening towards the back 135 of the ram body 130.

The ram arms 110, 120 comprise substantially hollow structures, each defining an interior space which houses the hydraulic cylinders 310, 320 (depicted in greater detail in FIGS. 6B, 7B-7D) when the ram 100 is combined with a packer 200 (depicted in greater detail in FIGS. 2A-2F), the combination of which further enables a self-contained compactor system 300 (as illustrated in FIGS. 3A-3E). In some embodiments, the arms 110, 120 can be substantially rectangular in shape, as illustrated in FIGS. 1A-1F In some embodiments, the arms 110, 120 can comprise slot-and-tabs 113, 123 disposed lengthwise along the arms so that the top surface 111, 121 and bottom surface 116, 126 are juxtaposed with the inside surface 117*a*, 117*b* and outside surface 127*a*, 127*b* of the arms 110, 120. The slot-and-tabs form a part of an interlocking design that assists with structural integrity and assembly of the arms 110, 120. The interlocking design minimizes the need for complex fixturing and helps make the assembly more repeatable.

As mentioned above, each of the arms 110, 120 can be defined by an insertion end 112, 122 and an extension end 115, 125. The insertion end 112, 122 is the end of the arms 110, 120 that is inserted into the packer 200 (depicted in greater detail in FIGS. 2A-2F). The extension ends 115, 125 are the end of the arms farthest from the ram body 130. In other words, the extension ends 115, 125 are disposed distal to a front or compacting face 133 of the ram body 130. The insertion end 112, 122 can be open such that it is configured to receive a hydraulic cylinder. The extension end 115, 125 can comprise a bevel 114, 124 and a cap 118, 128 to cover the extension end 115, 125. Proximate the extension end 115, 125 of each of the arms 110, 120 is a hole 119, 129 for securing a respective hydraulic cylinder. In some embodiments, the arms 110, 120 may each comprise a pin cap 150*a*, 150*b*.

Disposed on a top surface 111, 121 and a bottom surface 116, 126 of the arms 110, 120 is an abrasion-resistant liner 151. The abrasion-resistant liner 151 can be any suitable abrasion-resistant liner known in the art, including steels.

Figure 3A:
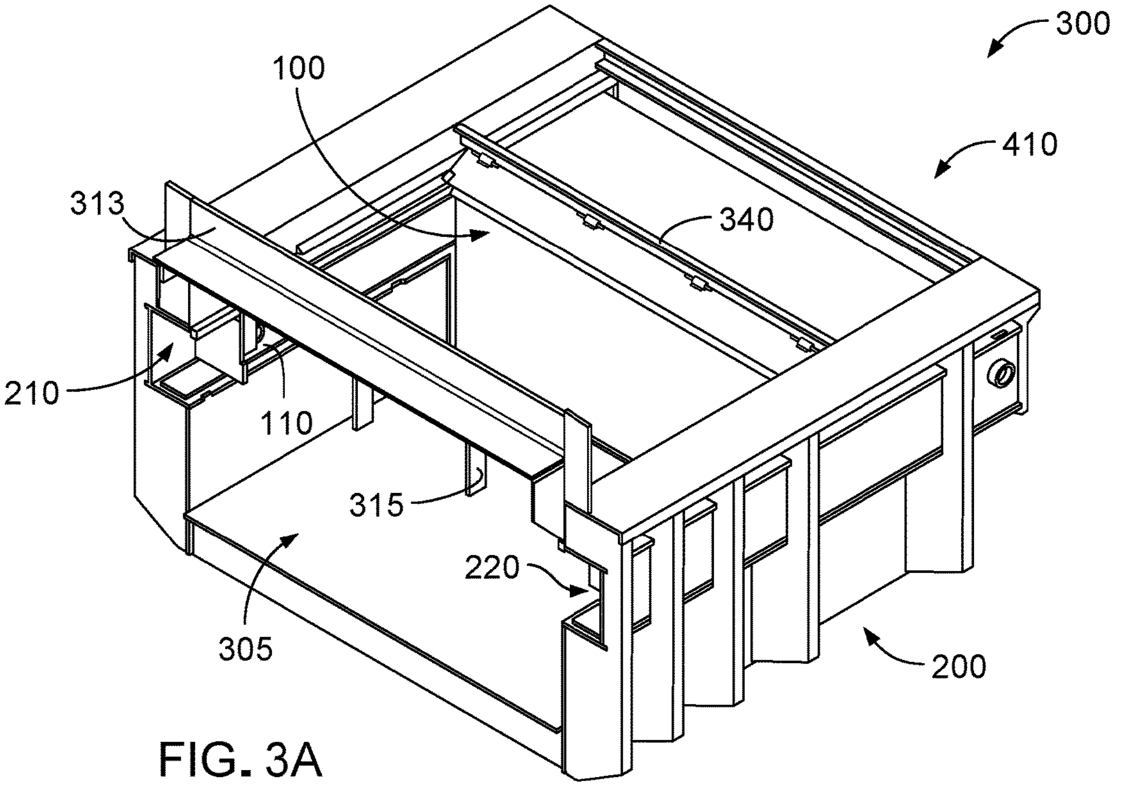
FIGS. 3A-3E illustrate various views of a self-contained compactor system in various stages of ram extension and retraction from the packer, according to some embodiments of the present disclosure.
Figure 3B:
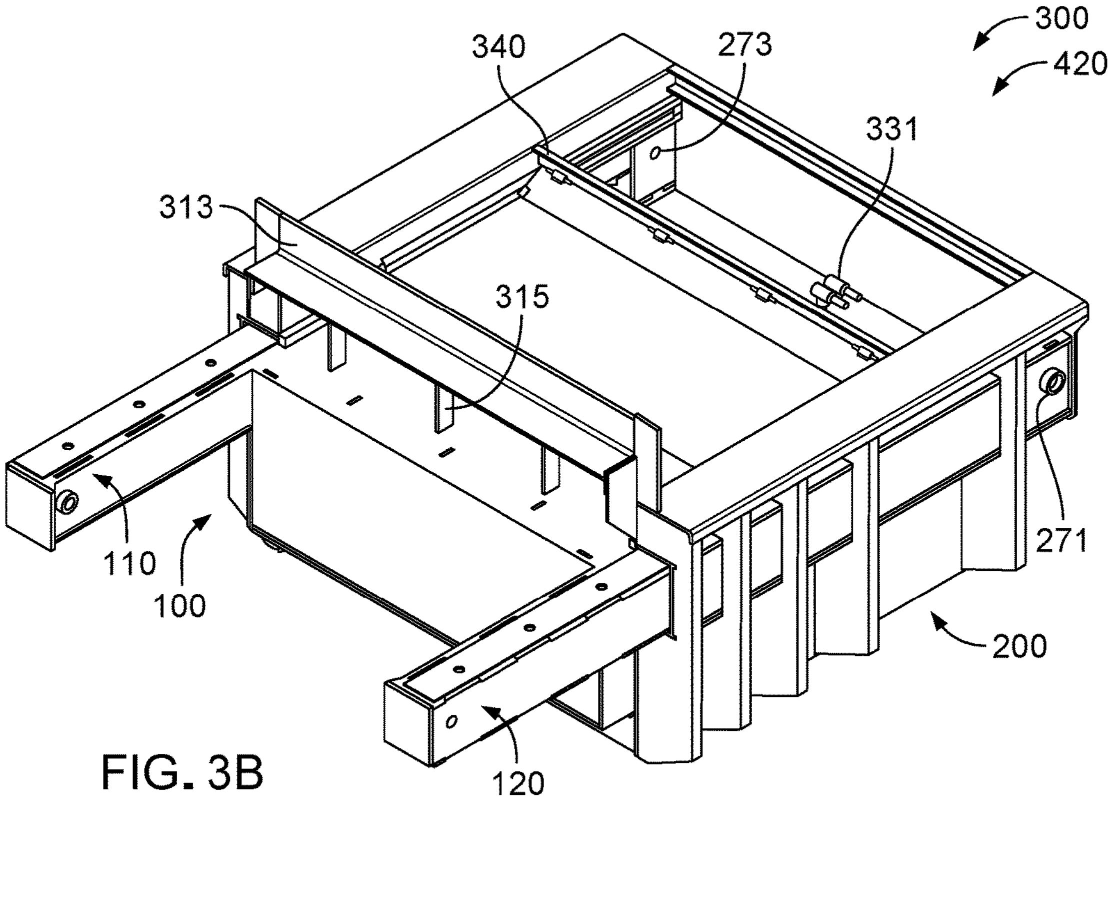
Figure 3C:
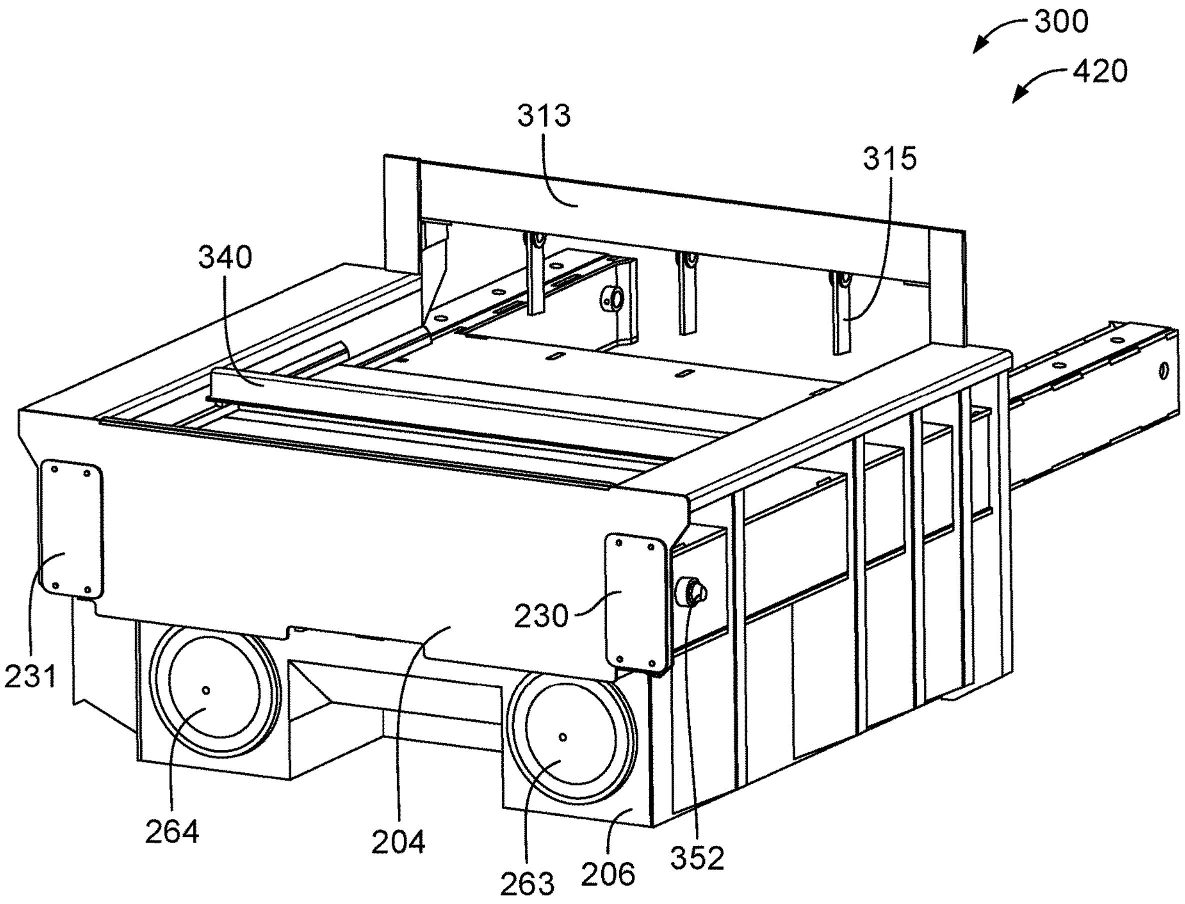
Figure 3D:
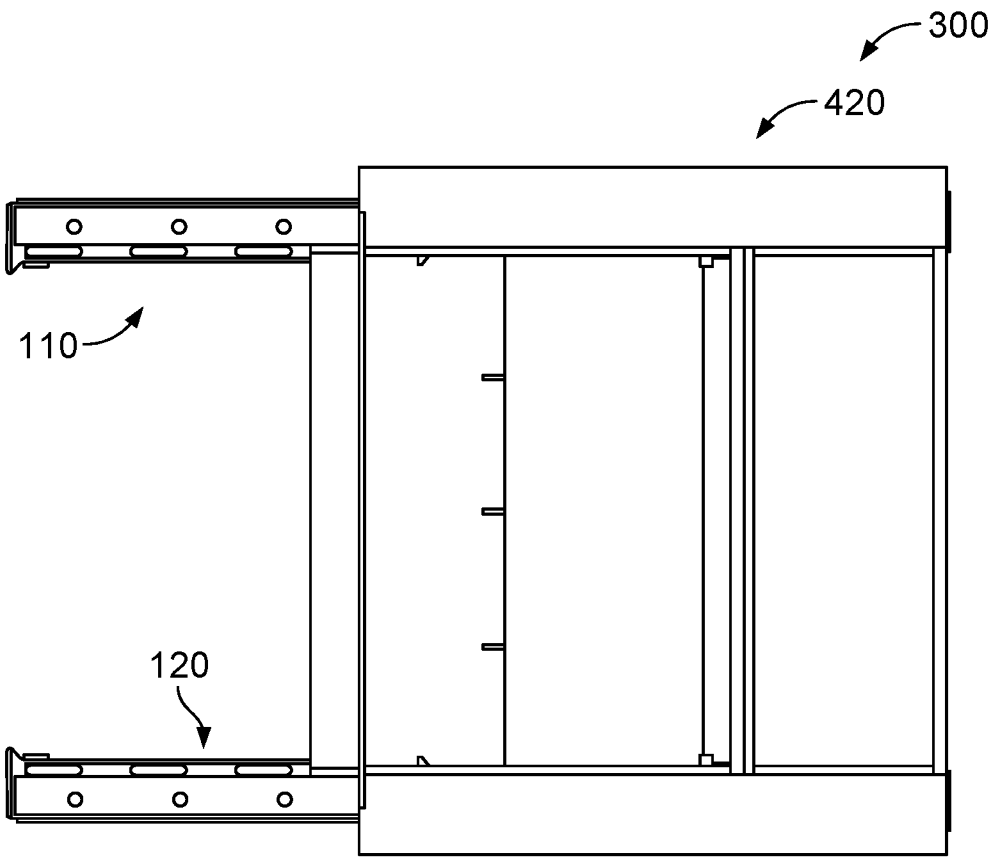
Figure 3E:
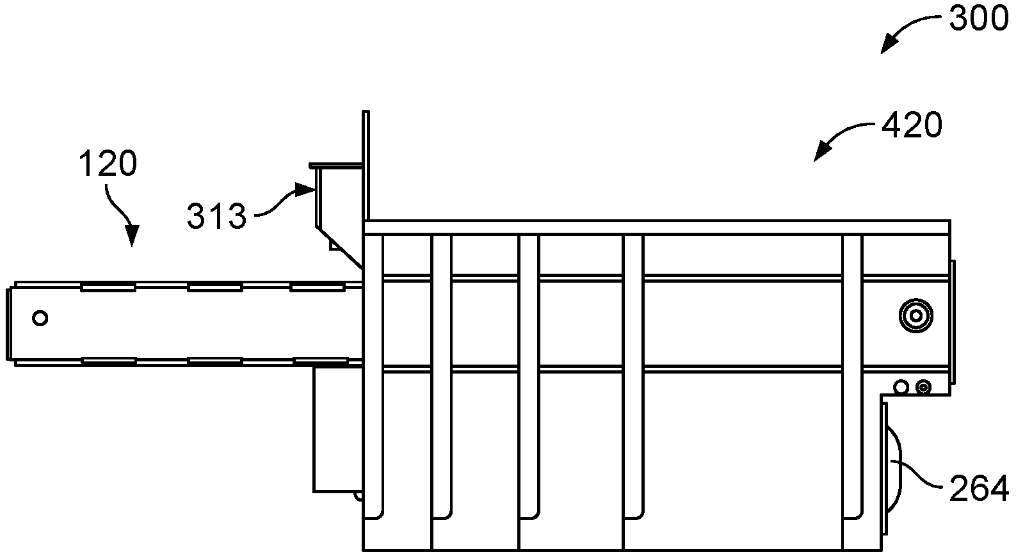
Figure 4A:
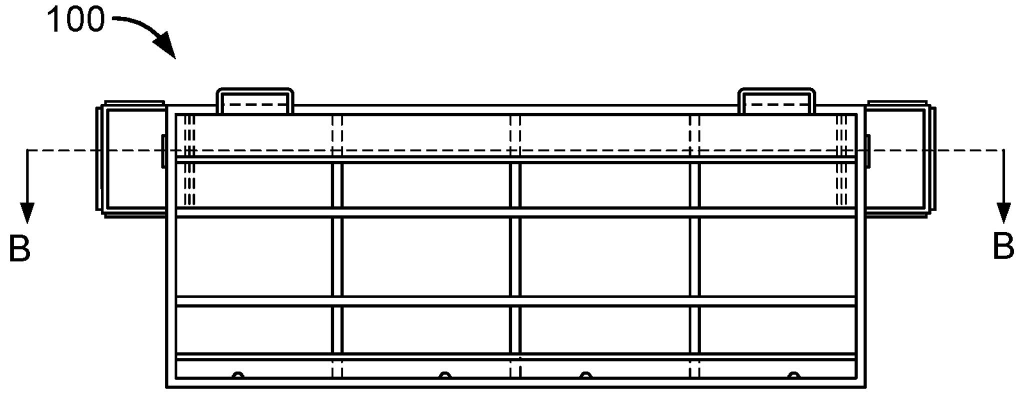
FIGS. 4A-4C illustrates a back view, a horizontal cutaway view, and a detail view of a ram, according to some embodiments of the present disclosure.
Figure 4B:
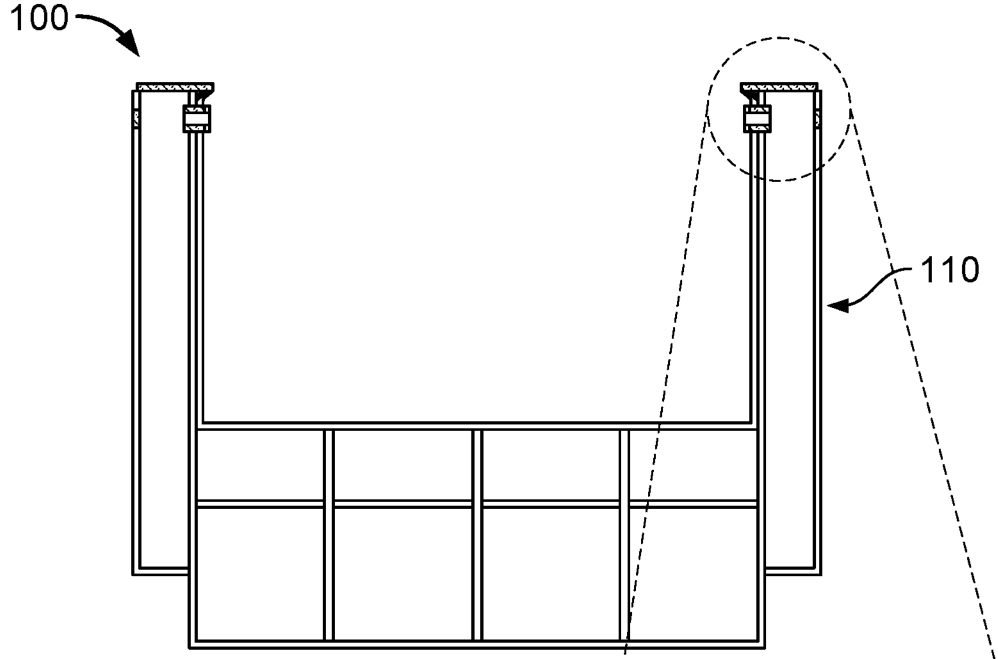
Figure 4C:
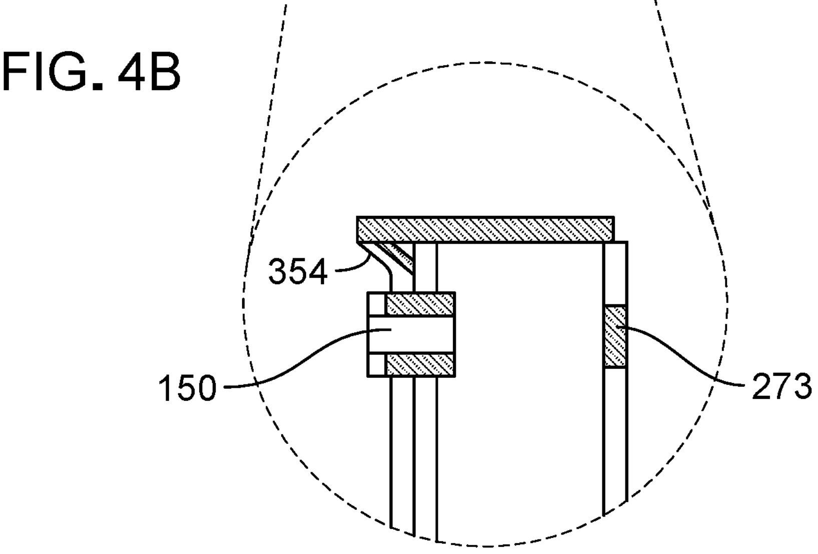

The ram body 130 can generally comprise a compacting face 133 that extends downwards from the arms 110, 120 and serves to compact trash disposed within the charge chamber 305 of the compactor system 300 (as illustrated in FIG. 3A). In some embodiments, the ram body 130 can comprise the structure illustrated in FIG. 1F. The front face 133 of and in particular, a top surface 131 and a bottom surface 139 can be substantially flat. The back 135 of ram body 130 can comprise a plurality of vertical panels 137, disposed between tapered side portions 138*a*, 138*b*, further comprising a plurality of horizontal shelves 136, such that the back 135 is divided into a honeycomb-like structure open at the back and with front 133 forming a closed end of each cell of the honeycomb-like structure. The rearmost face 132 can comprise tabs 134*a*, 134*b* for catching a drag plate 340 as shown in FIGS. 3A-3C of the assembly 300 when the ram is being extended. The drag plate prevents material from falling behind the ram when fully extended.

Figure 2A:
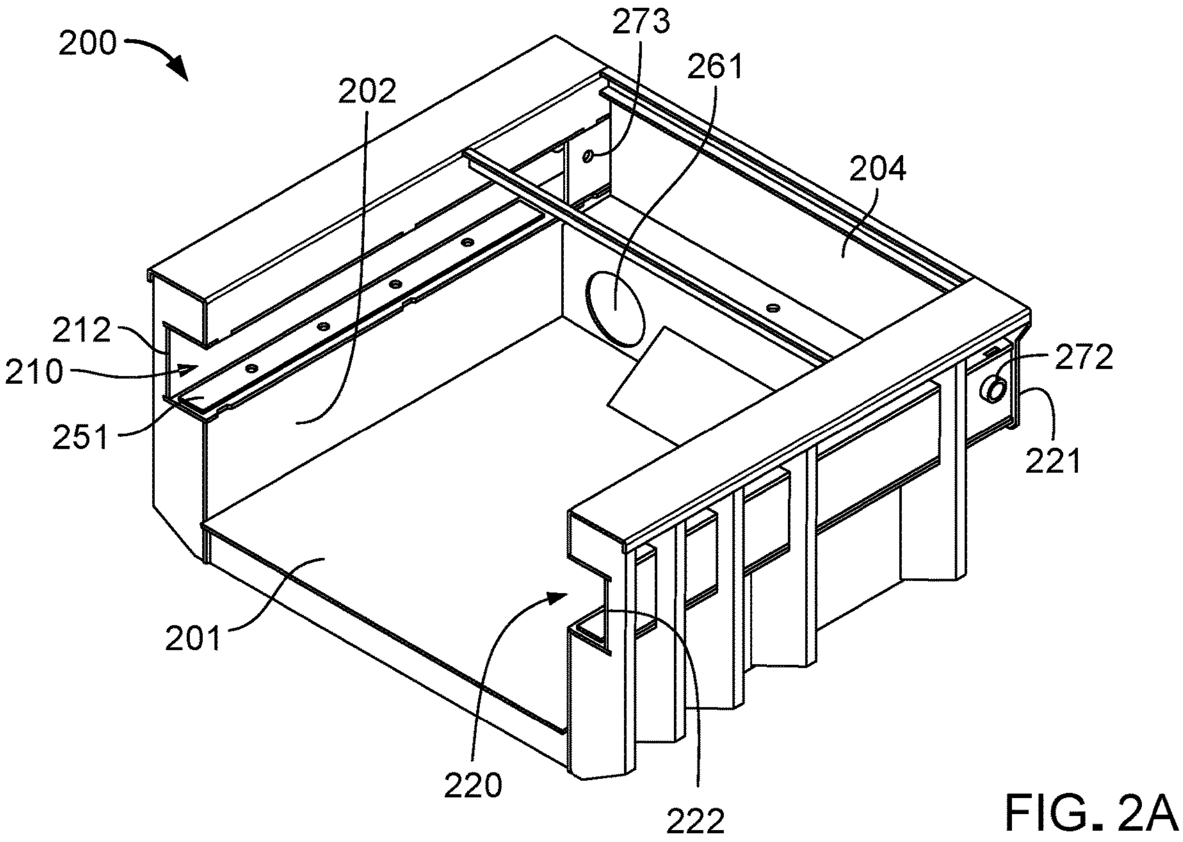
FIGS. 2A-2F illustrate various views of a packer for a self-contained compactor system, according to some embodiments of the present disclosure.
Figure 2B:
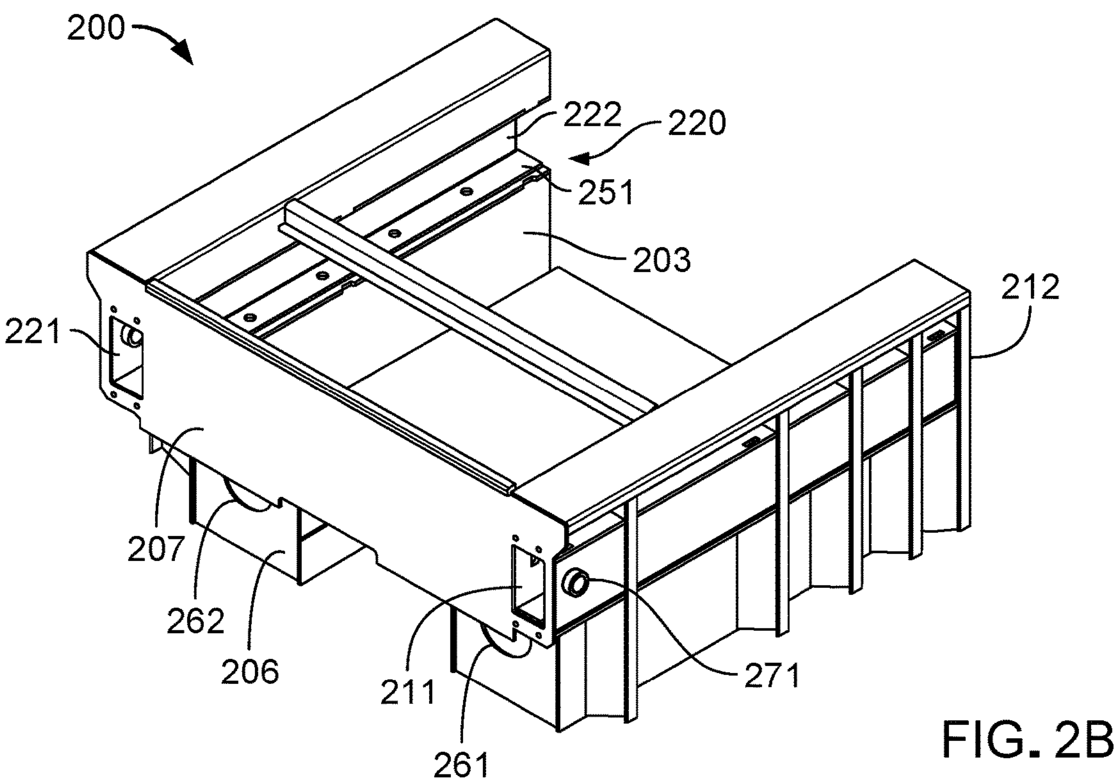
Figure 2C:
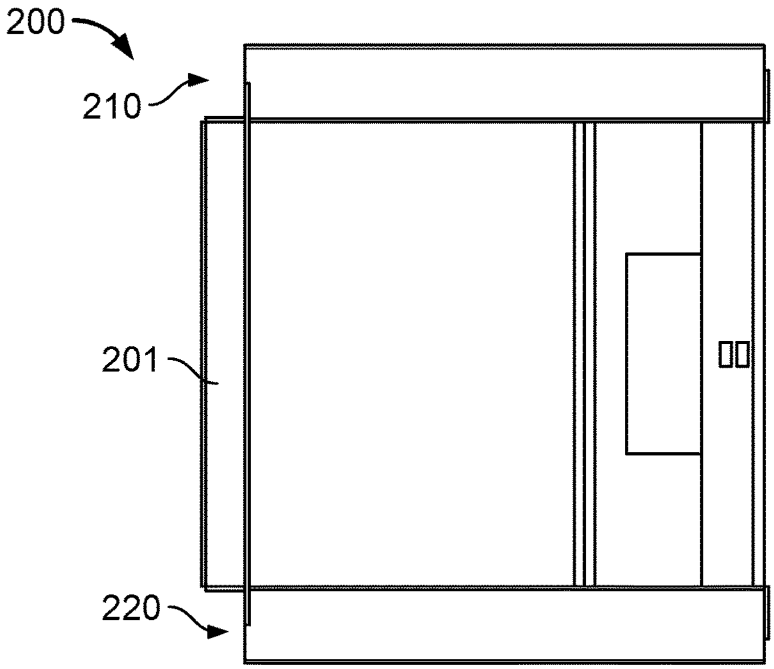
Figure 2D:
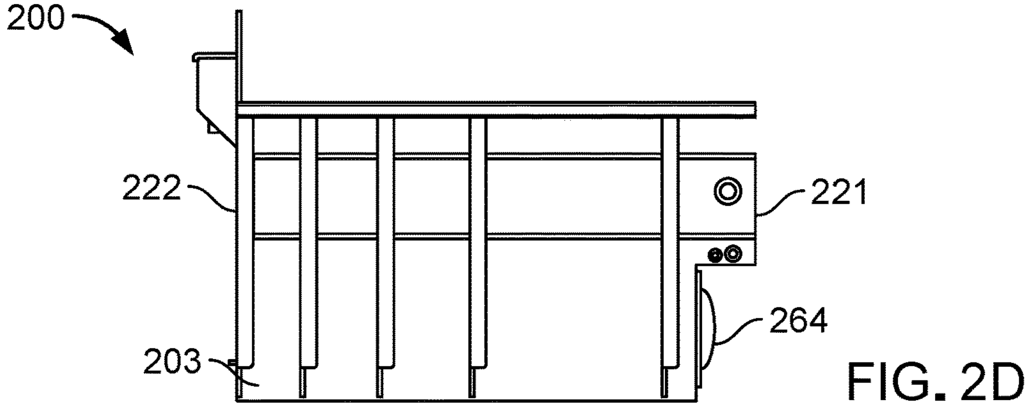
Figure 2E:
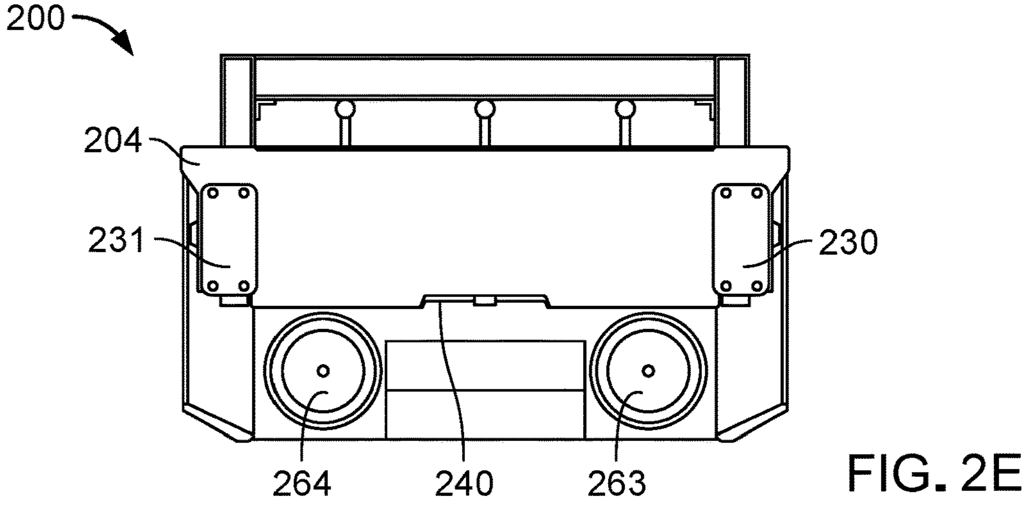
Figure 5A:
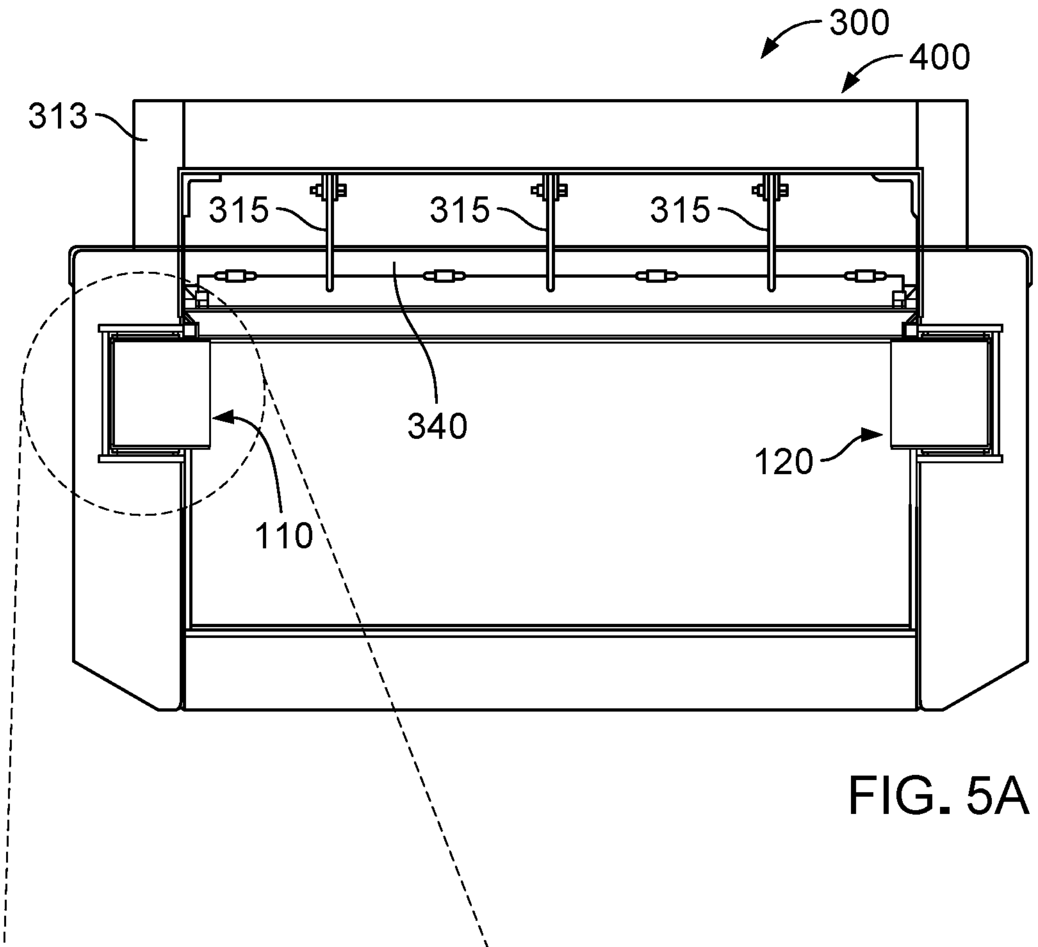
FIGS. 5A-5B illustrates a front view and a detail view of a self-contained compactor system, according to some embodiments of the present disclosure.
Figure 5B:
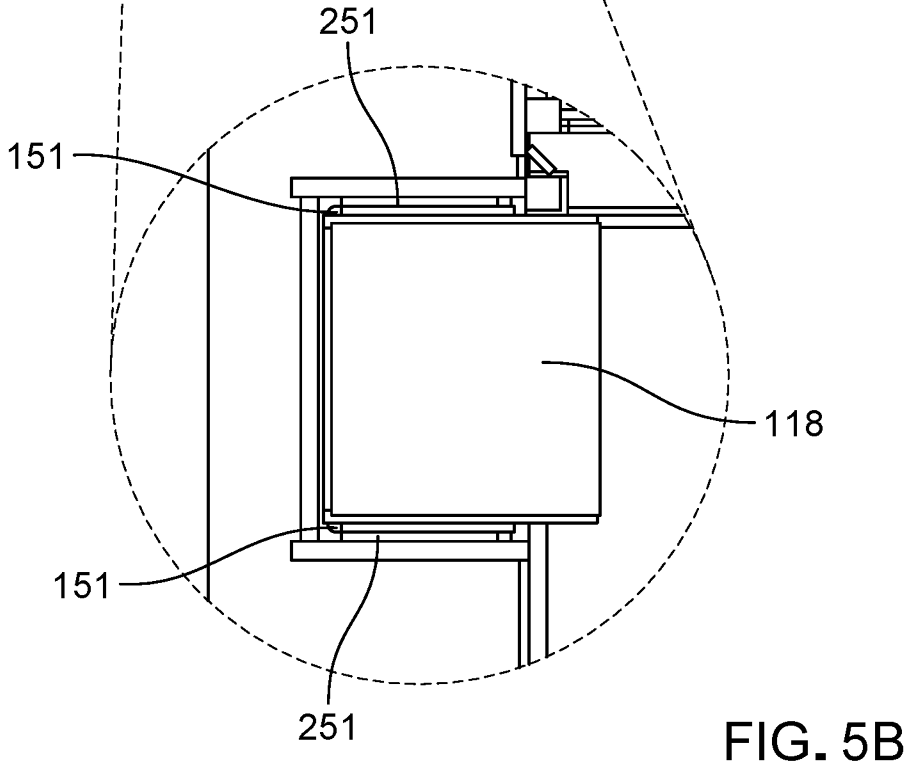

FIGS. 2A-2F illustrate various views and elements of a packer 200, according to some embodiments of the presently disclosed self-contained compactor systems. The packer 200 can generally comprise a floor 201, side walls 202, 203, and a back wall 204. Disposed proximate a top portion of each side wall 202, 203 is a pocket 210, 220 for slidably receiving a respective arm 110, 120 of the ram 100, as illustrated for instance in FIGS. 3A-3B. The pockets 210, 220 can be disposed horizontally across the top portion of each side wall 202, 203 and parallel to the floor 201 of the packer 200. The pockets 210, 220 are composed of cut-outs within the side walls 202, 203 of the packer 200 and have approximately a rectangular C-shaped cross-section, as illustrated in FIGS. 5A-5B. The pockets 210, 220 comprise open ends. A front end 212, 222 of each pocket 210, 220 is configured to receive an insertion end 112, 122 of each respective arm 110, 120 and a back end 211, 221 of each pocket 210, 220 facilitates access to the hydraulic cylinders 310, 320 to be disposed within the pockets 210, 220. In some embodiments, the packer 200 can comprise covers 230, 231 for covering the back end 211, 221 of each pocket 210, 220, as illustrated in FIG. 2E. The pockets 210, 220 further comprise an abrasion-resistant liner 251 on the top and bottom surface of each pocket 210, 220, composed of the same, a similar, or a complimentary material as the abrasion-resistant liners 151 lining the arms 110, 120 of the ram 100.

In some embodiments, the floor 201 of the packer 200 can be flat and solid unlike prior designs which had an open cavity under the packer floor to allow liquid and material that got behind the ram a path to empty out the front of the packer floor.

Figure 2F:
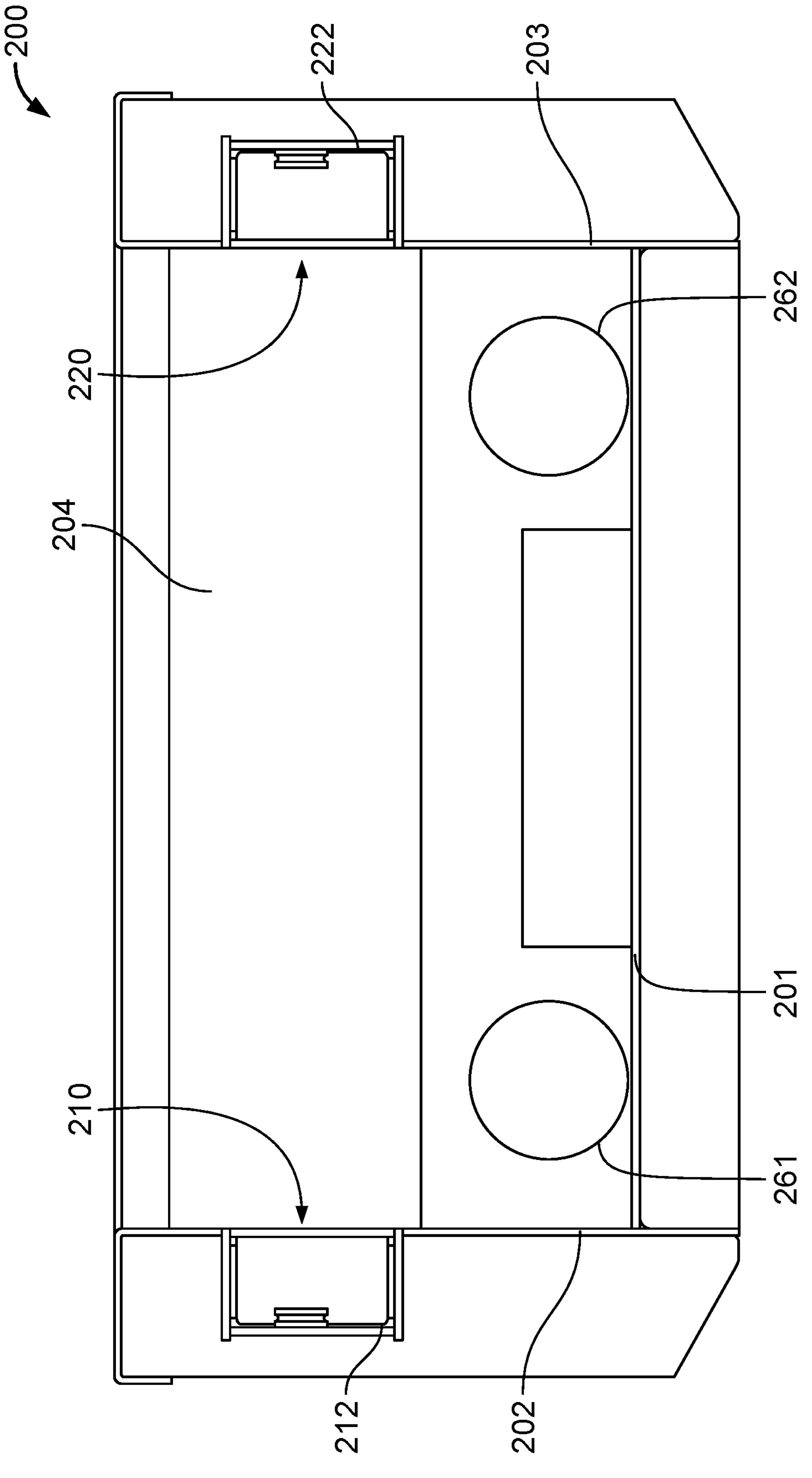
Figure 9:
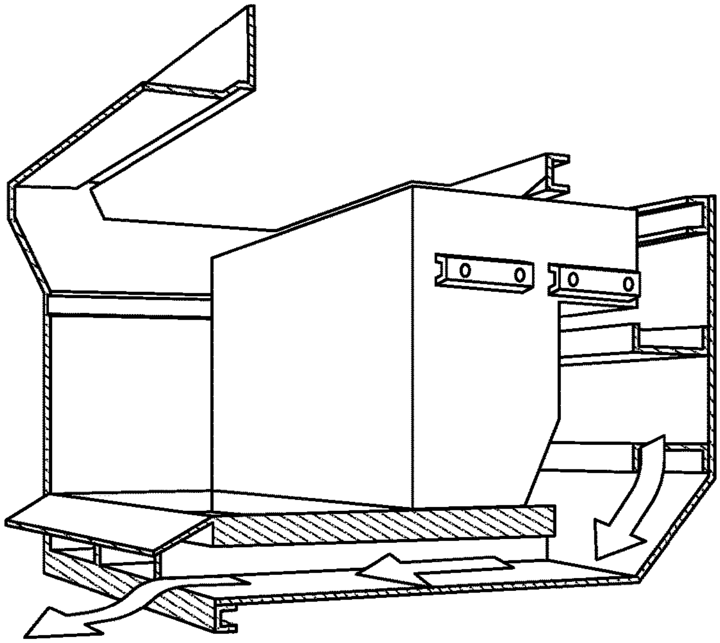
FIG. 9 illustrates a prior art cleanout system, which some embodiments of the present disclosure have improved upon.

In some embodiments, as illustrated in FIGS. 2A-2F, the packer 200 can further comprise an improved cleanout system, used in place of the open cavity under the packer floor in previous designs, illustrated in FIG. 9. As illustrated in FIGS. 2A, 2B, and 2F, the improved cleanout system can comprise circular holes 261, 262 disposed within an exterior surface 206 below the back wall 204, the holes 261, 262 opening into such space 308 (FIG. 6B) as can be defined within system 300 as that which is internal to the packer 200 and also behind the back 135 of the ram body 130. The circular holes 261, 262 can be disposed on a bottom portion of the back wall 204 of the packer 200 and beneath a projecting portion of the back wall 204 of the packer 200. The improved cleanout system can further comprise caps 263, 264 (shown in FIGS. 2E and 3C) that cover the circular holes 261, 262. The caps 263, 264 can be removable so that the interior of the self-contained compactor system can be cleaned out easily with commonly available tools, rather than by physically entering a confined space.

To provide hydraulic power to the cylinders 310, 320 and actuate the ram 100, the packer 200 can comprise a plurality of internal hoses 330 (FIG. 6B) and a plurality of external hoses 240 (FIG. 2E). In some embodiments, for example, the packer 200 can comprise 4 internal hoses and 4 external hoses. In some embodiments, the internal hoses 330 can be disposed underneath each hydraulic cylinder and connect at connectors 331 to the external hoses 240 which can be disposed beneath a back wall 204 of the packer 200.

FIGS. 3A-3E illustrate an assembly of the packer 200 and ram 100 to form the self-contained compactor system 300, according to some embodiments of the present disclosure. A back end 135 of the ram body 130 can be inserted into the packer 200, such that the insertion end (112, 122) of each of the first and second arms 110, 120 is inserted within the pockets 210, 220 of the packer 200. As illustrated in FIG. 3B, the extension ends (115, 125) of each of the arms 110, 120 can be disposed external to the self-contained compactor system 300 when the ram is in a fully extended position. As the self-contained compactor system is actuated, the arms 110, 120 can move horizontally within the pockets 210, 220 away from the back end 211, 221 of each pocket 210, 220. The pockets serve both to retain and guide the arms 110, 120 and thus guide and retain the ram body 130 in position within the packer 200. Further, the pockets 210, 220 serve to support the weight of ram 100 in such a way as to limit the friction wear during compaction to the abrasion-resistant liners 151, 251 (shown working together in FIG. 5B) and therefore extend the life of the packer floor 201 and the ram bottom 139.

Figure 6A:
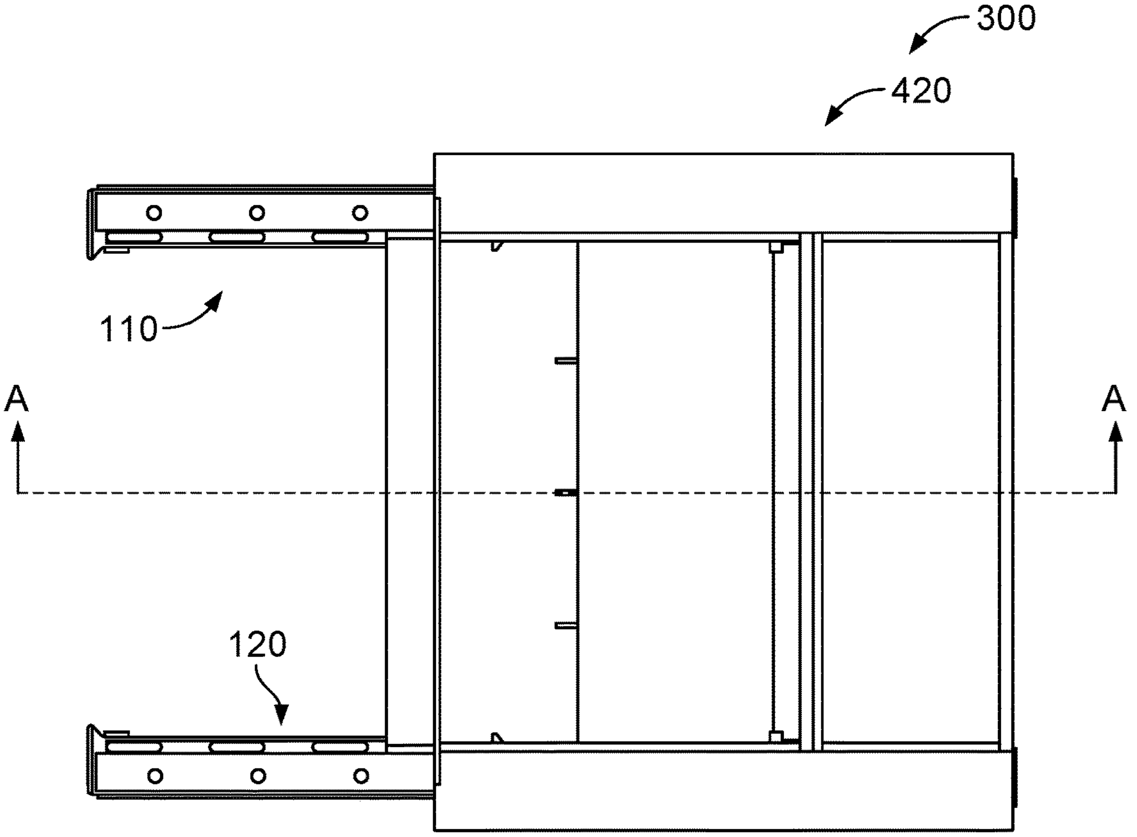
FIGS. 6A-6B illustrates a top view and a vertical cutaway view of a self-contained compactor system, according to some embodiments of the present disclosure.
Figure 6B:
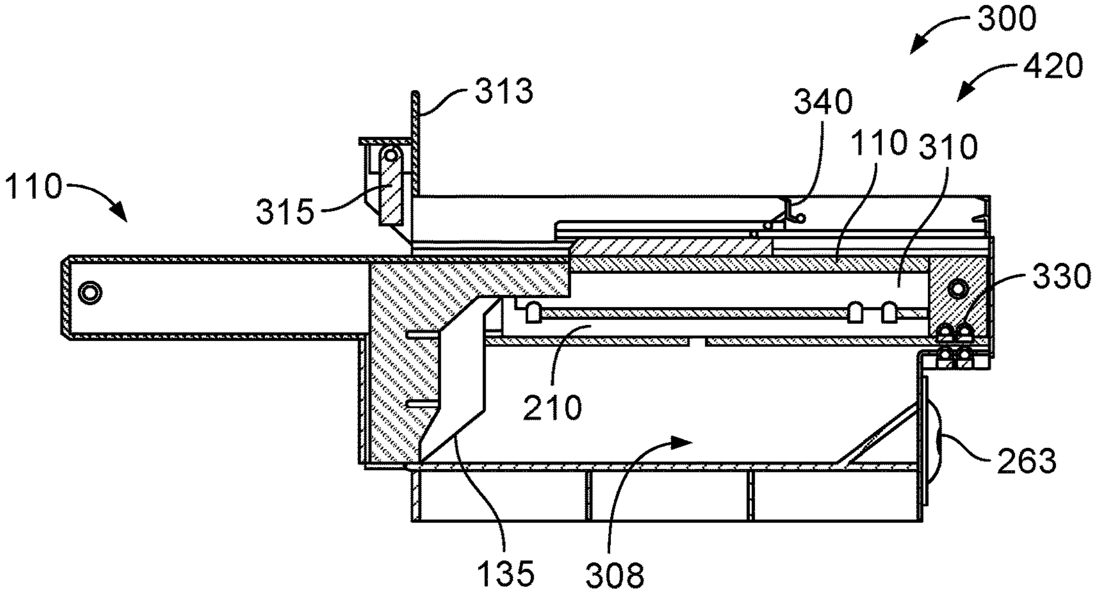

FIGS. 6A and 6B depict various sectioned views illustrating the inside of the pockets 210, 220 of packer 200. As illustrated in FIG. 6B, as FIG. 6A is sectioned along the line A-A, a portion of the arm 110 is inserted within the pocket 210. A hydraulic cylinder 310 is disposed within the arm 110. Internal hoses 330 are disposed within the self-contained compactor system 300 and external hoses 240 disposed outside the self-contained compactor system 300. FIG. 6B further depicts a side view of a cap 263 for the improved cleanout system.

Figure 7A:
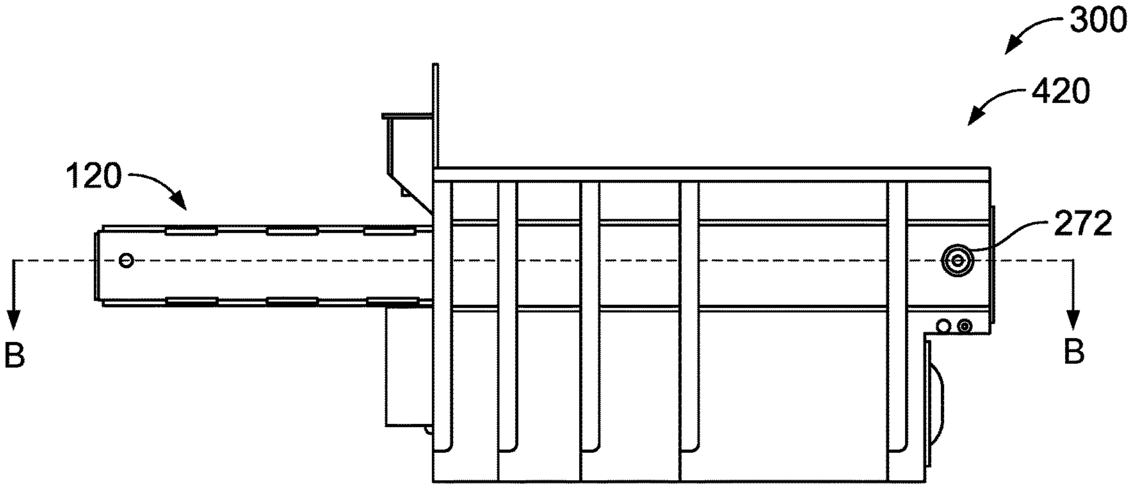
FIGS. 7A-7D illustrates a side view, a horizontal cutaway view, and two detail views of a self-contained compactor system, according to some embodiments of the present disclosure.
Figure 7B:
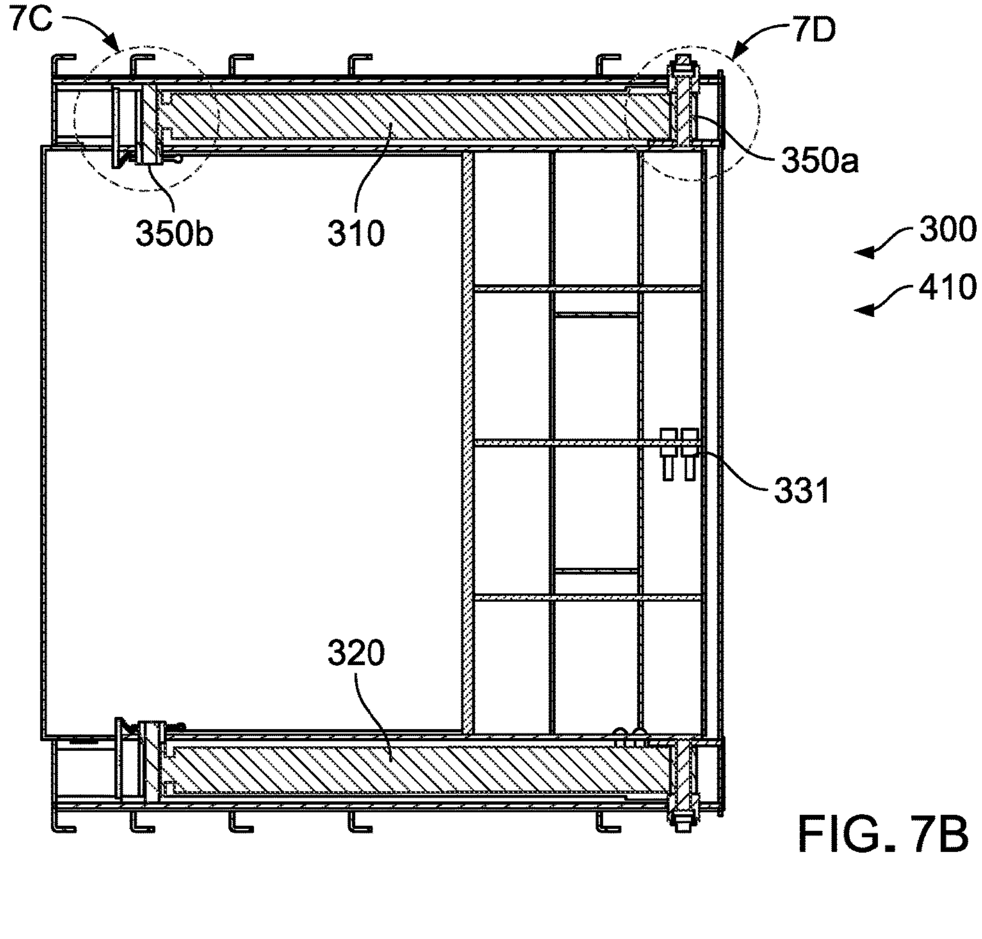

FIG. 7B, sectioned along the line B-B in FIG. 7A, illustrates the connecting method of the cylinders 310, 320 with the pockets 210, 220 and the arms 110, 120. As illustrated in FIG. 7B, each cylinder 310, 320 comprises connecting members 350*a*, 350*b* (further illustrated in FIGS. 7C and 7D) disposed proximate each end of the cylinder. The connecting member 350*a*, 350*b* can be disposed widthwise within the pocket 210. In some embodiments, the connecting member can comprise a cylindrical structure disposed perpendicular to the hydraulic cylinder 310, 320 (and therefore widthwise within the first and second arms 110, 120).

Figure 7C:
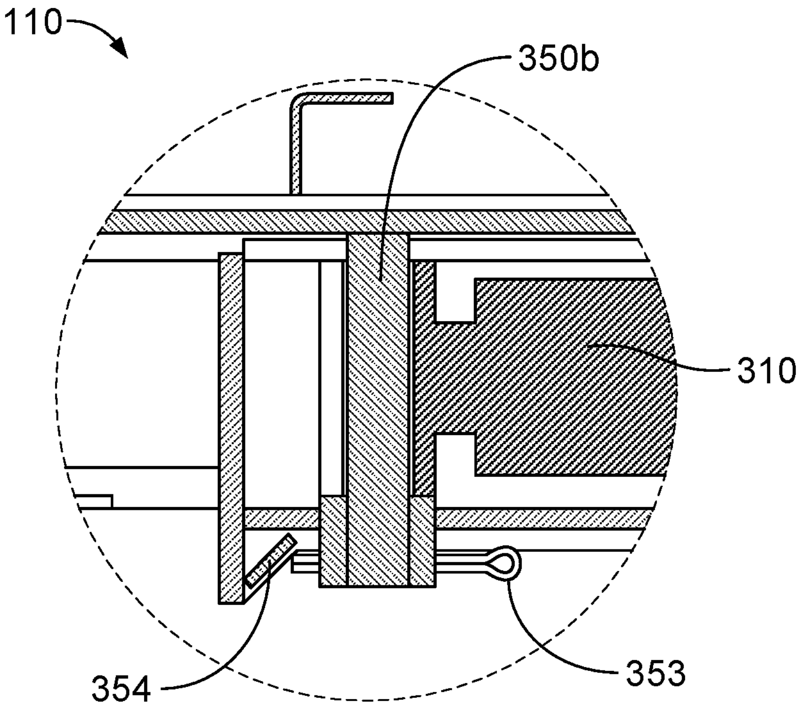

In some embodiments, as illustrated in FIG. 7C, the mechanism for connecting the arm 110 to the cylinder 310 includes a cotter pin 353 which extends through the cap 150*a* (see FIG. 1A) and terminates proximate a structural gusset 354. The cotter pin 353 extends through the connecting member 350*b* to couple the cylinder 310 with the arm 110. This allows a cylinder to be disconnected from the packer 100 while outside the system 300.

Figure 7D:
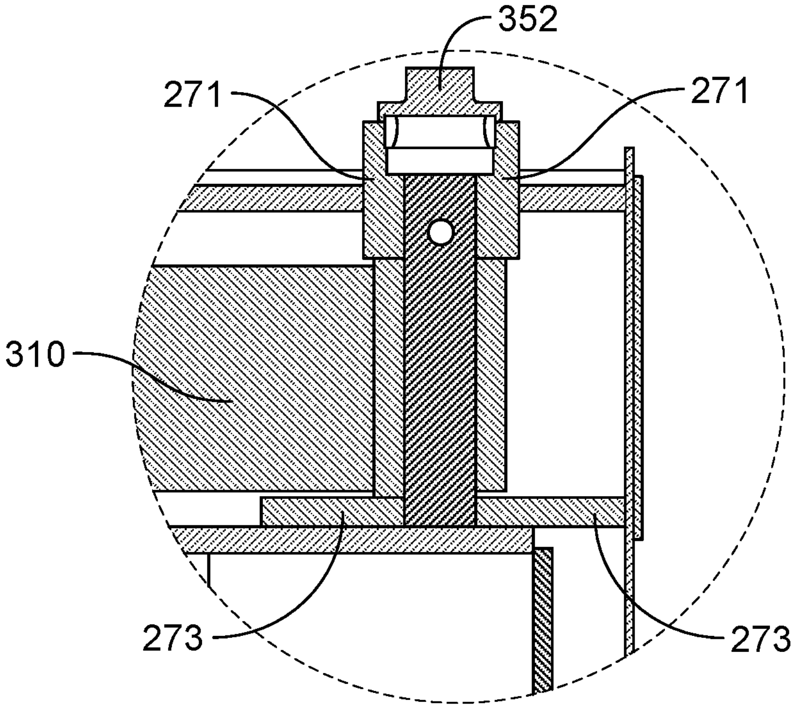

In some embodiments, as illustrated in FIG. 7D, the mechanism for connecting the cylinder 310 to the pocket 210 includes coupling the connecting member 350*a* to circular holes 271, 273 in the pocket and holding it in place via a removable plug 352. This allows a cylinder to be disconnected from the packer 200 and then removed from the outside of the self-contained compactor system 300 after also disconnecting member 350*b* and removing the covers 230, 231.

Figure 8:
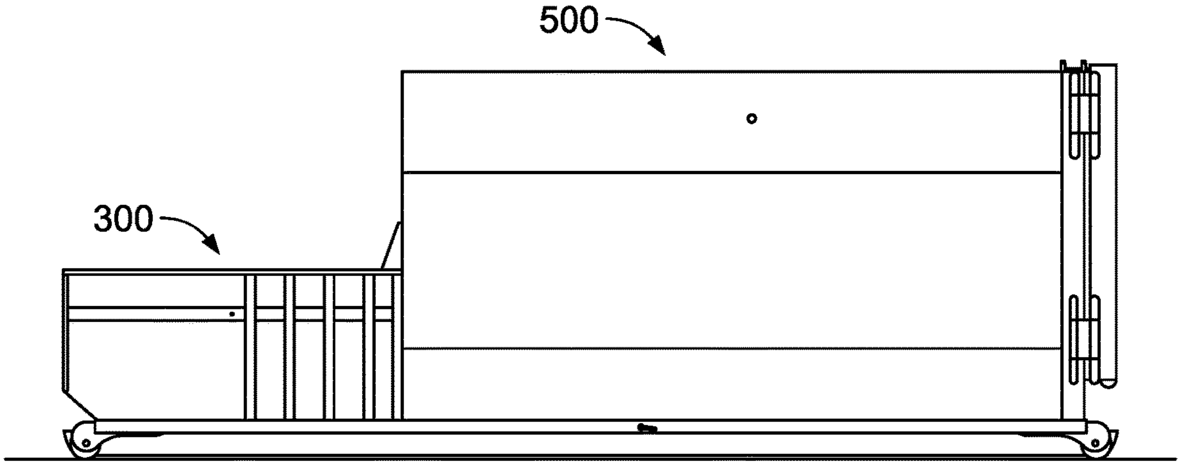
FIG. 8 illustrates a self-contained compactor system with container body, according to some embodiments of the present disclosure.

The self-contained compactor system 300 further comprises additional conventional features such as a container body 500 as illustrated in FIG. 8, and a breaker bar 313 as shown in FIG. 3A, which adds rigidity to the structure so that if a large object becomes obstructed at the opening of the container body 500, continued compaction will not damage the container body 500. Retainer teeth 315 are attached to the breaker bar 313 prevent material from springing back into the charge chamber 305 of the complete system 300 during compaction of refuse into the container body 500.

FIGS. 3A and 3B illustrate the self-contained compactor system 300 in various stages of ram 100 extension from the packer 200. FIG. 3A shows the system 300 in a retracted position 410, functionally open and configured for receiving refuse in the charge chamber 305. FIG. 3B shows the system 300 in a fully extended position 420, such that refuse which may have been in the charge chamber 305 is now compacted into a container body 500 which would be attached at the front of packer 200, proximal to the breaker bar 313. This extension and retraction is powered by the hydraulic cylinders 310, 320 which extend to move the arms 110, 120 of the ram 100 within the pockets 210, 220 of the packer 200.

Figure 10A:
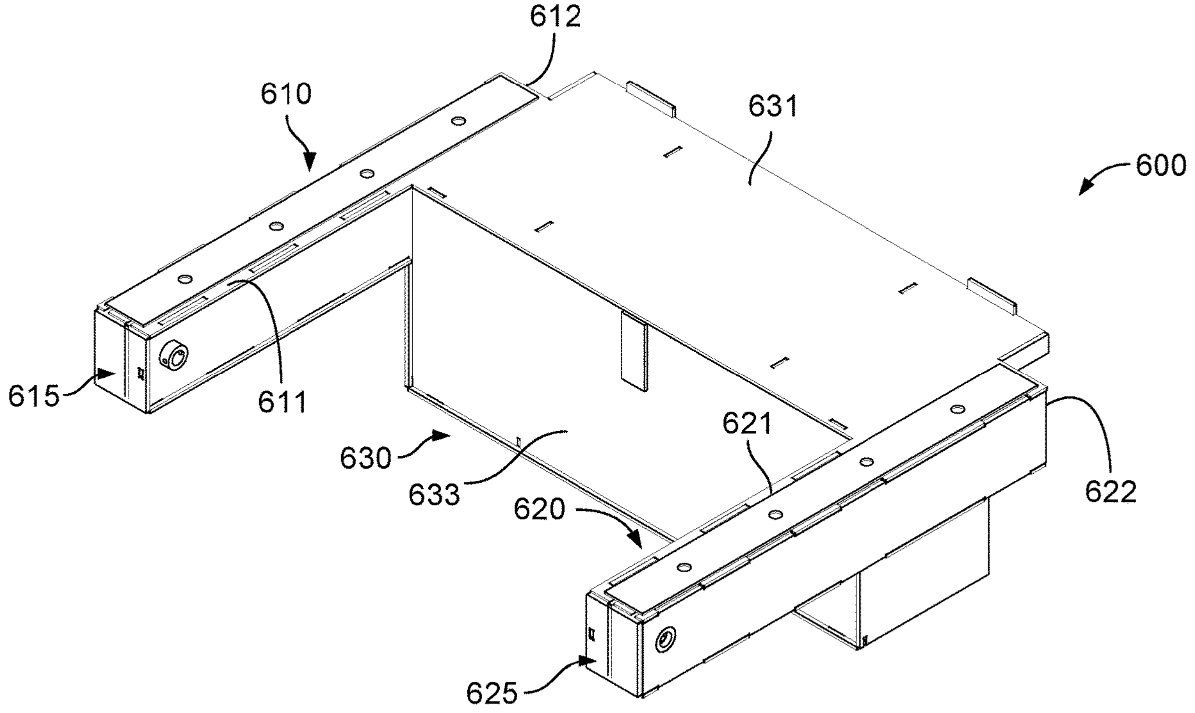
FIGS. 10A-10C illustrate isometric views of another ram for a self-contained compactor system, according to some embodiments of the present disclosure.
Figure 10B:
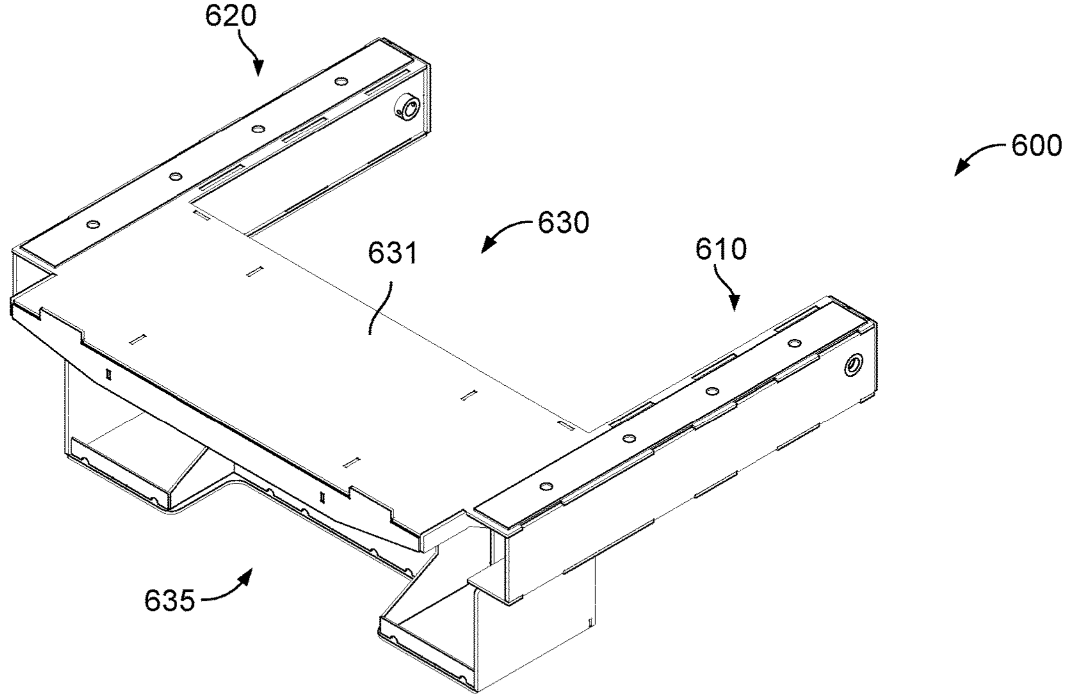
Figure 10C:
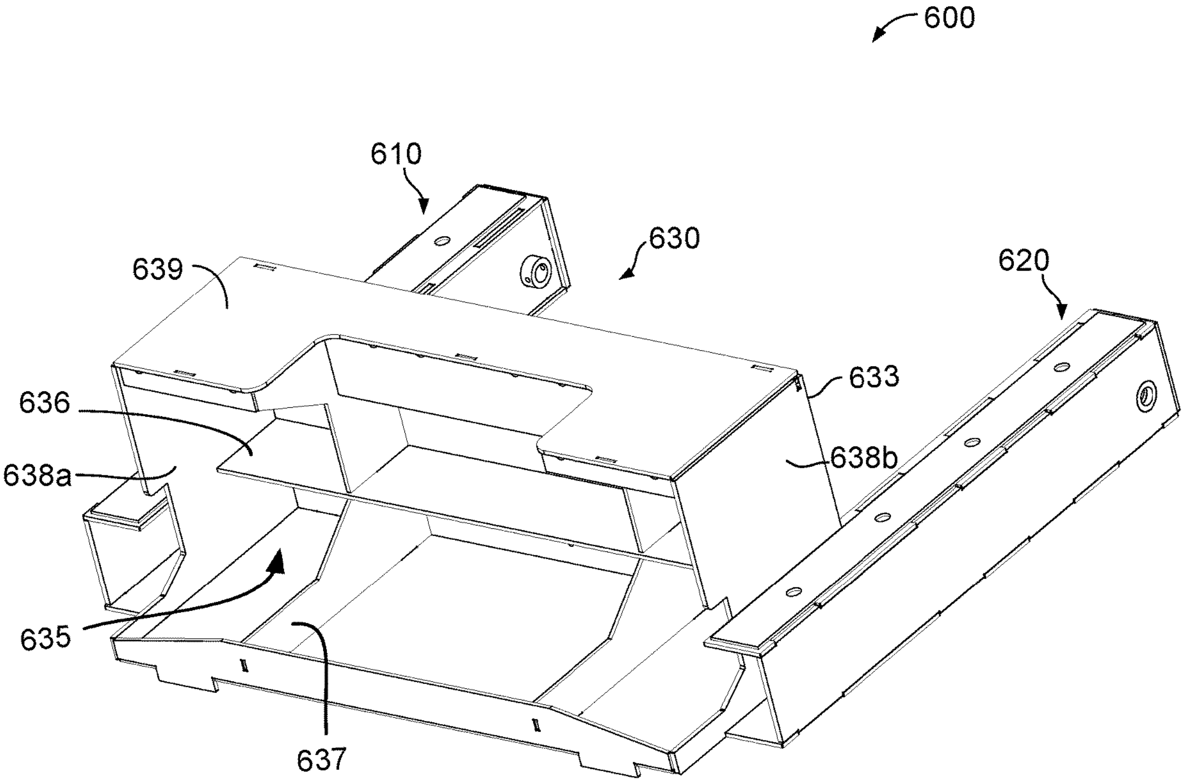

FIGS. 10A-10C illustrate various views of a ram 600 of another self-contained compactor system 800 (depicted in FIG. 12), according to some embodiments. As can be seen in FIGS. 10A-10C, the ram 600 generally comprises a first arm 610, a second arm 620, and a ram body 630. The first arm 110 and the second arm 120 comprise extensions of the ram body 130 via a top surface 611, 621 of each of the first arm 610 and the second arm 620 which top surfaces 611, 621 are integral to a top surface 631 of the ram body 630, as illustrated for instance in FIG. 10A. Additionally, each of the first arm 610 and the second arm 620 can be defined by an insertion end 612, 622 and an extension end 615, 625. Each of the first arm 610 and the second arm 620 can be set parallel to each other and perpendicular to and beyond and in front of a front face 633 of the ram 600. Each of the first and second arms 610, 620 have an axial length between the extension end 615, 625 and the insertion end 612, 622 of each respective arm 610, 620 with the insertion end 612, 622 offset rearward of the compacting face 633, opening towards the back 635 of the ram body 630.

Figure 11A:
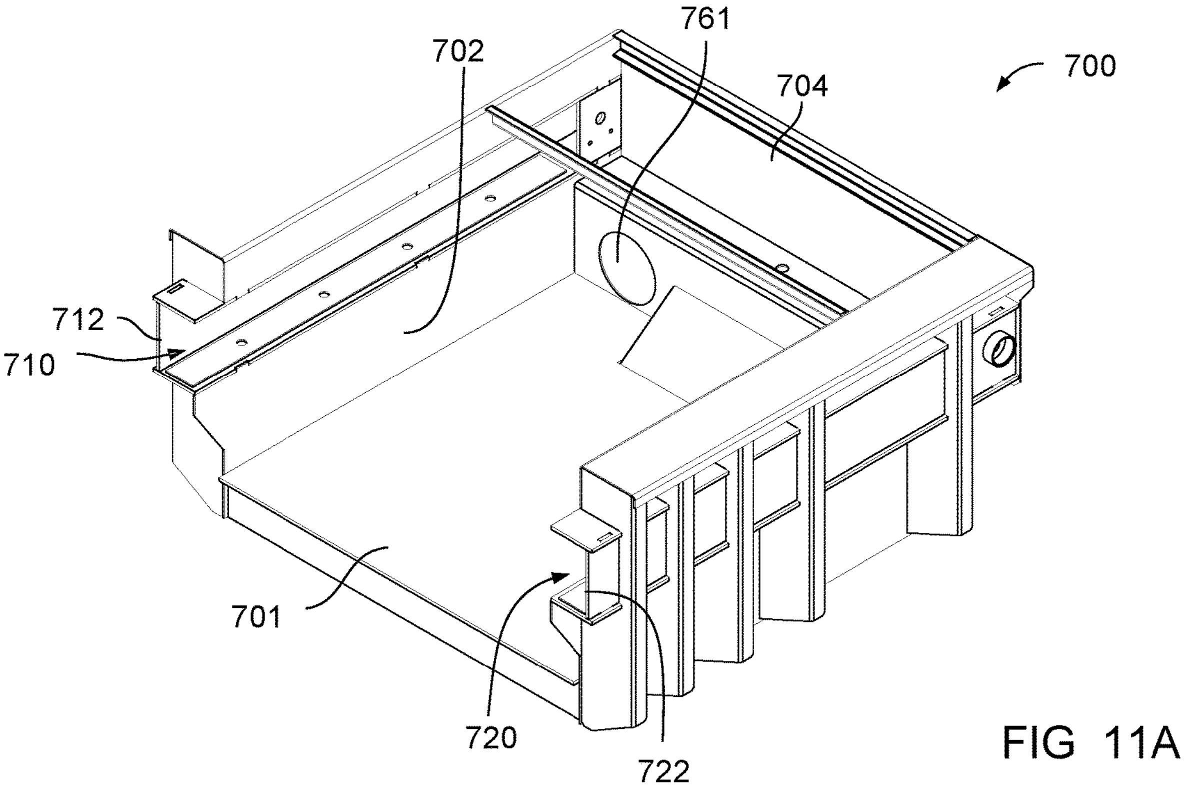
FIGS. 11A and 11B illustrate various views of another packer for a self-contained compactor system, according to some embodiments of the present disclosure.
Figure 11B:
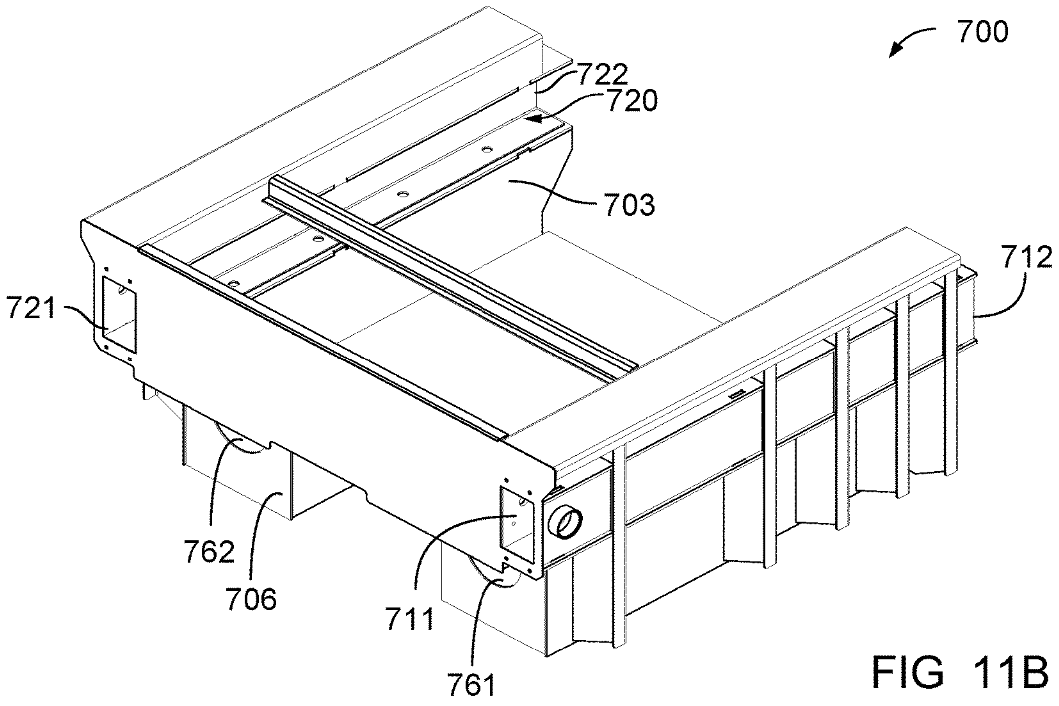
Figure 12:
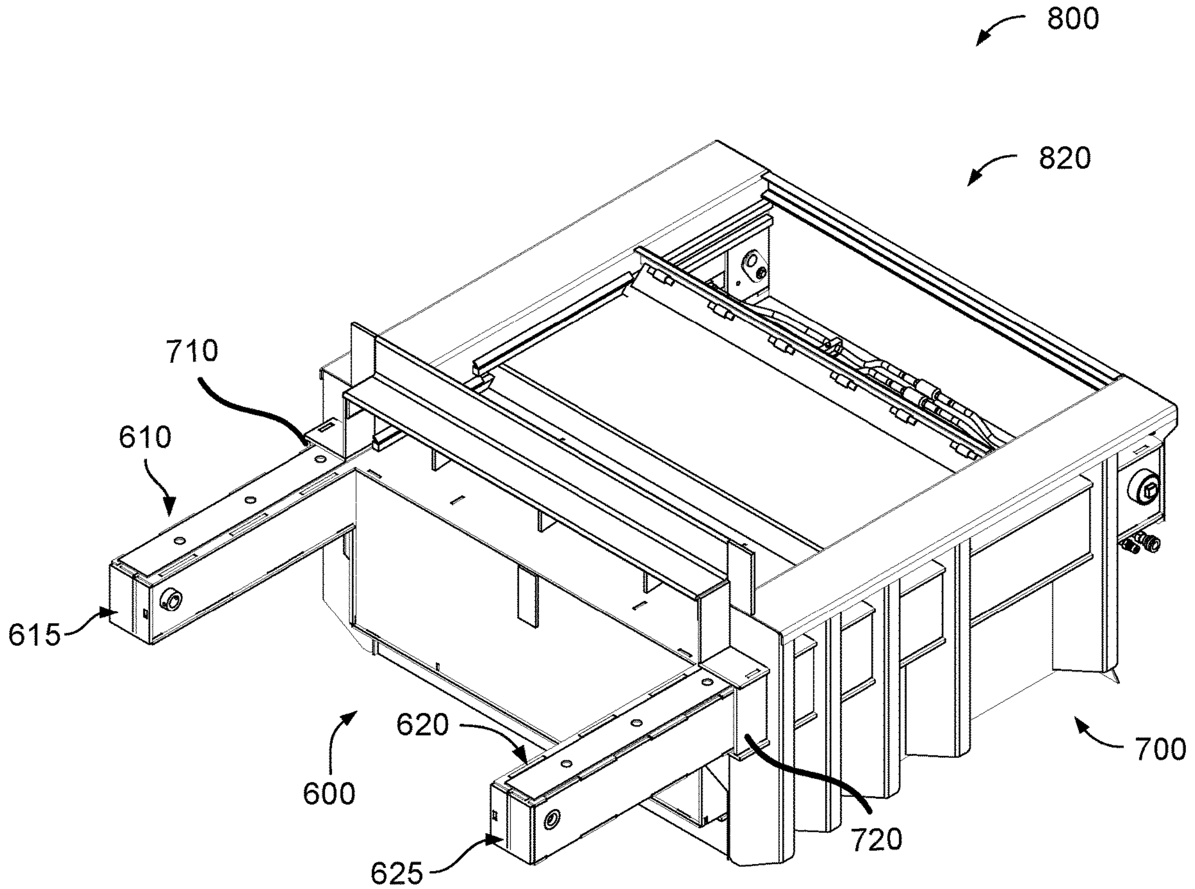
FIG. 12 illustrates another self-contained compactor system that includes the ram of FIGS. 10A-10C and the packer of FIGS. 11A and 11B.

The ram arms 610, 620 comprise substantially hollow structures, each defining an interior space which houses hydraulic cylinders (e.g. hydraulic cylinders 310, 320 in FIGS. 6B, 7B-7D) when the ram 600 is combined with a packer 700 (depicted in greater detail in FIGS. 11A-11B), the combination of which further enables a self-contained compactor system 800 (as illustrated in FIG. 12). The insertion end 612, 622 is the end of the arms 610, 620 that is inserted into the packer 700. The extension ends 615, 625 are disposed distal to a front or compacting face 633 of the ram body 630.

The ram body 630 can generally comprise a compacting face 633 that extends downwards from the arms 610, 620 and serves to compact trash disposed within a charge chamber (e.g., chamber 305 of FIG. 3A) of the compactor system 800 (as illustrated in FIG. 12). In some embodiments, the ram body 630 can comprise the structure illustrated in FIG. 10C. For example, the front face 633 of and in particular, a top surface 631 and a bottom surface 639 of the ram body 630 can be substantially flat. The back 635 of ram body 630 can comprise a plurality of vertical panels 637, disposed between tapered side portions 638*a*, 638*b*, further comprising one or more horizontal shelves 636, such that the back 635 is divided into a honeycomb-like structure open at the back and with front 633 forming a closed end of each cell of the honeycomb-like structure. As depicted in FIG. 10C, in some implementations, the bottom surface 639 of the ram body 630 can be configured to extend beyond the one or more horizontal shelves 636, which allows for improved engagement of the ram 600 with the packer 700 when the ram 600 is in a fully extended position (as depicted in FIG. 12).

FIGS. 11A and 11B illustrate front and rear views of a packer 700 of the compactor system 800 (as depicted in FIG. 12). The packer 700 can generally comprise a floor 701, side walls 702, 703, and a back wall 704. Disposed proximate a top portion of each side wall 702, 703 is a pocket 710, 720 for slidably receiving a respective arm 610, 620 of the ram 600, as illustrated for instance in FIG. 12. The pockets 710, 720 can be disposed horizontally across the top portion of each side wall 702, 703 and parallel to the floor 701 of the packer 700. The pockets 710, 720 are composed of cut-outs within the side walls 702, 703 of the packer 700 and have approximately a rectangular C-shaped cross-section. The pockets 710, 720 comprise open ends. A front end 712, 722 of each pocket 710, 720 is configured to receive an insertion end 612, 622 of each respective arm 610, 620 and a back end 711, 721 of each pocket 710, 720 facilitates access to the hydraulic cylinders to be disposed within the pockets 710, 720. As can be seen in FIGS. 11A and 11B, in some implementations, the pockets 710, 712 extend beyond the respective side walls 702,703 such that the front end 712, 722 of each pocket 710, 720 is positioned in front of and extends beyond the floor 701 of the packer 700, which allows for improved engagement of the packer 700 with the ram 600 when the ram 600 is in a fully extended position (as depicted in FIG. 12).

In some embodiments, as illustrated in FIGS. 11A and 11B, the packer 700 can further comprise an improved cleanout system, used in place of the open cavity under the packer floor in previous designs. As illustrated in FIGS. 11A and 11B, the improved cleanout system can comprise circular holes 761, 762 disposed within an exterior surface 706 below the back wall 704, the holes 761, 762 opening into such space as can be defined within system 800 as that which is internal to the packer 700 and also behind the back 635 of the ram body 630. The circular holes 761, 762 can be disposed on a bottom portion of the back wall 704 of the packer 700 and beneath a projecting portion of the back wall 704 of the packer 700. The improved cleanout system can further comprise caps (e.g., caps 263, 264 shown in FIGS. 2E and 3C) that cover the circular holes 761, 762. The caps can be removable so that the interior of the self-contained compactor system 800 can be cleaned out easily with commonly available tools, rather than by physically entering a confined space.

To provide hydraulic power to the cylinders and actuate the ram 600, the packer 700 can comprise a plurality of internal hoses (e.g., hose 330 of FIG. 6B) and a plurality of external hoses (e.g., hose 240 of FIG. 2E).

The self-contained compactor system 800 further comprises additional conventional features such as a container body (e.g., container body 500 as illustrated in FIG. 8) and a breaker bar (e.g., breaker bar 313 as shown in FIG. 3A), which adds rigidity to the structure so that if a large object becomes obstructed at the opening of the container body 500, continued compaction will not damage the container body.

FIG. 12 shows the self-contained compactor system 800 in a fully extended position 820, such that refuse which may have been in the charge chamber of the system 800 is compacted into a container body be attached at the front of packer 700, proximal to the breaker bar. Extension and retraction of the ram 600 within the packer 700 is powered by hydraulic cylinders which extend to move the arms 610, 620 of the ram 600 within the pockets 710, 720 of the packer 700. As previously discussed, the bottom surface 639 of the ram body 630 extends beyond the one or more horizontal shelves 636 and the pockets 710, 712 of the packer 700 extend forward such that the front end 712, 722 of each pocket 710, 720 is positioned in front and extends beyond the floor 701 of the packer 700. These features allows for improved engagement of the packer 700 with the ram 600 when the ram 600 is in a fully extended position 820.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

The invention claimed is:

1. A self-contained compactor system comprising:
a packer comprising:
a back wall;
a floor;
a first side wall; and
a second side wall;
wherein the back wall, the floor, and the first and second side walls define a space for receiving a trash load; and
wherein the first side wall defines a first pocket extending along the first side wall in a lengthwise direction and the second side wall defines a second pocket extending along the second side wall in the lengthwise direction;

a first hydraulic cylinder disposed within and coupled to the first pocket and a second hydraulic cylinder disposed within and coupled to the second pocket; and a ram comprising:

a ram body; and first and second arms, each of the first and second arms comprising an elongated body having a longitudinal axis that extends outwardly from the ram body in the lengthwise direction along an entire length of the respective arm, wherein the first and second arms of the ram are configured to be inserted within the first and second pockets of the packer and further configured to move along the first and second pockets in the lengthwise direction, and wherein the first hydraulic cylinder has a longitudinal axis that is coincident with the longitudinal axis of the first arm, and the second hydraulic cylinder has a longitudinal axis that is coincident with the longitudinal axis of the second arm.

2. The self-contained compactor system of claim 1, further comprising an abrasion-resistant liner disposed on a top surface of each of the first and second arms and a bottom surface of each of the first and second arms.

3. The self-contained compactor system of claim 2, further comprising an abrasion-resistant liner disposed on a top surface of each of the first and second pockets and on a bottom surface of each of the first and second pockets.

4. The self-contained compactor system of claim 1, wherein:

the first pocket extends along a length of a top portion of the first side wall; and the second pocket extends along a length of a top portion for the second side wall.

5. The self-contained compactor system of claim 1, further comprising:

a first pin disposed proximate to an insertion end of the first arm, the first pin configured to connect the first hydraulic cylinder to the first arm;

a second pin disposed proximate to an insertion end of the second arm, the second pin configured to connect the second hydraulic cylinder to the second arm;

a third pin configured to couple the first hydraulic cylinder to the first pocket of the packer proximate to the back wall of the packer; and a fourth pin configured to couple the second hydraulic cylinder to second pocket of the packer proximate to the back wall of the packer.

6. The self-contained compactor system of claim 5, wherein the third pin is received by a hole at a distal portion of the first pocket, and wherein the fourth pin is received by a hole at a distal portion of the second pocket.

7. The self-contained compactor system of claim 5, further comprising:

a first connector disposed perpendicularly, with respect to the first hydraulic cylinder, within the first pocket; and a second connector disposed perpendicularly, with respect to the second hydraulic cylinder, within the second pocket, wherein the first and second pins extend through the first and second connectors, respectively, thereby connecting the first hydraulic cylinder to the first arm and the second hydraulic cylinder the second arm.

8. The self-contained compactor system of claim 1, further comprising:

a first connector disposed perpendicularly, with respect to the first hydraulic cylinder, within the first pocket proximate the back wall of the packer, the first connector coupling the first hydraulic cylinder to the first pocket; and a second connector disposed perpendicularly, with respect to the second hydraulic cylinder, within the second pocket proximate the back wall of the packer, the second connector coupling the second hydraulic cylinder to the second pocket.

9. The self-contained compactor system of claim 8, wherein the first connector is received by a first hole through the first pocket, and wherein the second connector is received by a second hole through the second pocket.

10. The self-contained compactor system of claim 1, further comprising a plurality of removable plugs configured to retain a position of each of the first and the second hydraulic cylinders within the respective pocket of the first and second pockets.

11. The self-contained compactor system of claim 1, wherein each of the first arm and the second arm comprises an insertion end and an extension end;

wherein the insertion end is proximate to and offset from a back end of the ram body;

wherein the extension end is distal to a front end of the ram body; and wherein the first arm is parallel to the second arm.

12. The self-contained compactor system of claim 11, wherein the elongated body of each of the first and second arms is a straight body extending between the insertion end and the extension end, and wherein each of the first and second hydraulic cylinders is secured at the first end of the respective arm.

13. The self-contained compactor system of claim 1, further comprising a cleanout system comprising:

a first hole and a second hole, the first hole and second hole each extending from the back wall of the packer into the space for receiving the trash load; and a first cap and a second cap configured to cover the first and second holes.

14. The self-contained compactor system of claim 1, wherein the first and second arms each comprise a top surface coplanar with a top surface of the ram body.

15. The self-contained compactor system of claim 1, further comprising removable covers covering an opening defined by a distal end of each of the first and second pockets, wherein the removable covers are configured to facilitate access to the first and second hydraulic cylinders.

16. The self-contained compactor system of claim 1, wherein the ram body has a compacting face and a back portion positioned rearward of the compacting face, the back portion including a plurality of vertical panels.

17. The self-contained compactor system of claim 16, wherein the ram body includes one or more horizontal shelves intersecting the plurality of vertical panels.

18. The self-contained compactor system of claim 1, wherein each of the first and second arms comprise a slot and a tab disposed along the longitudinal axis of the respective arm, the slot and tab configured to interlock with each other.

19. A self-contained compactor system comprising:

a packer comprising a first side wall and a second side wall, wherein the first side wall defines a first pocket and the second side wall defines a second pocket, the first and second pockets each disposed on the packer, wherein a first hydraulic cylinder is housed within and coupled to the first pocket and a second hydraulic cylinder is housed within and coupled to the second pocket; and a ram disposed at least partially within the packer, the ram comprising first and second arms, each of the first and second arms comprising an elongated body having a longitudinal axis that extends outwardly from the ram body in a lengthwise direction along an entire length of the respective arm, the first and second arms disposed within the first and second pockets of the packer, respectively, and connected to a respective hydraulic cylinder, wherein each of the hydraulic cylinders is configured to cause the first and second arms to move within the first and second pockets in the lengthwise direction when the self-contained compactor system is activated, and wherein the first hydraulic cylinder has a longitudinal axis that is coincident with the longitudinal axis of the first arm, and the second hydraulic cylinder has a longitudinal axis that is coincident with the longitudinal axis of the second arm.

20. The self-contained compactor system of claim 19, further comprising:

a first plurality of pins configured to couple each of the hydraulic cylinders to a respective arm of the first and second arms, each pin of the first plurality of pins being disposed proximate an end of one arm of the first and second arms; and a second plurality of pins configured to couple each of the hydraulic cylinders to the packer proximate a back wall of the packer, wherein each pin in the second plurality of pins is accessible from an exterior of the self-contained compactor system.

21. The self-contained compactor system of claim 19, further comprising:

a first connector disposed perpendicularly, with respect to, within the first pocket proximate a back wall of the packer, the first connector coupling the first hydraulic cylinder to the first pocket; and a second connector disposed perpendicularly, with respect to the second hydraulic cylinder, within the second pocket proximate the back wall of the packer, the second connector coupling the second hydraulic cylinder to the second pocket.

22. The self-contained compactor system of claim 19, further comprising a plurality of removable plugs, each removable plug of the plurality of removable plugs configured to retain a position of a respective hydraulic cylinder of the first and second hydraulic cylinders within the respective pocket of the first and second pockets.

23. The self-contained compactor system of claim 19, wherein:

the first pocket extends along a length of a top portion of the first side wall of the packer; and the second pocket extends along a length of a top portion for the second side wall of the packer.

24. The self-contained compactor system of claim 19, further comprising removable covers covering an opening defined by a distal end of each of the first and second pockets, wherein the removable covers are configured to facilitate access to the first and second hydraulic cylinders.

25. The self-contained compactor system of claim 19, wherein the hydraulic cylinders are configured to cause the first and second arms to move relative to a back wall of the packer in the lengthwise direction when the self-contained compactor system is activated.

* * * * *